US005541415A

United States Patent [19]

Shonka

[11] Patent Number: 5,541,415
[45] Date of Patent: *Jul. 30, 1996

[54] SELF-CALIBRATING RADIATION DETECTORS FOR MEASURING THE AREAL EXTENT OF CONTAMINATION

[75] Inventor: Joseph J. Shonka, Marietta, Ga.

[73] Assignee: Shonka Research Associates, Inc., Marietta, Ga.

[*] Notice: The term of this patent shall not extend beyond the expiration date of Pat. No. 5,440,135.

[21] Appl. No.: 471,000

[22] Filed: Jun. 6, 1995

Related U.S. Application Data

[63] Continuation of Ser. No. 115,203, Sep. 1, 1993, Pat. No. 5,440,135.
[51] Int. Cl.$^6$ ............................. G01T 1/167; G01T 1/185
[52] U.S. Cl. .................. 250/374; 250/252.1; 250/336.1; 250/375
[58] Field of Search ................................. 250/336.1, 374, 250/252.1 R, 375, 382, 384

[56] References Cited

U.S. PATENT DOCUMENTS

| | | |
|---|---|---|
| 2,842,676 | 7/1958 | Schiringe et al. |
| 3,174,040 | 3/1965 | Eberline . |
| 3,218,460 | 11/1965 | Scherbatskoy . |
| 3,317,823 | 5/1967 | Brodsky . |
| 3,603,797 | 9/1971 | Borkowski et al. |
| 3,670,164 | 7/1972 | Hardy et al. |

(List continued on next page.)

FOREIGN PATENT DOCUMENTS

| | | |
|---|---|---|
| 375069 | 5/1923 | Germany . |
| 52-67686 | 4/1977 | Japan . |

OTHER PUBLICATIONS

Crawford et al.; "Nonlinearities In The Charge Division Encoding of Position–Sensitive Detectors"; 1990; pp. 657–670; Nuclear Instruments and Methods in Physics Research A292.

Lampton et al.; "Delay Line Anodes For Microchannel–Plate Spectrometers"; 1987; pp. 2298–2305; Rev. Sci. Instrum. 58(12).

Rossi et al.; "Ionization Chambers And Counters–Experimental Techniques"; 1949; pp. 1–101; Behavior of Free Electroncs And Ions In Gases.

(List continued on next page.)

*Primary Examiner*—Carolyn E. Fields
*Assistant Examiner*—Edward J. Glick
*Attorney, Agent, or Firm*— Louis T. Isaf, P.C.; James A. Witherspoon

[57] ABSTRACT

An apparatus for detecting the area and concentration of radioactive contamination on surfaces, objects and personnel is disclosed. The apparatus is capable of automatic adjustment without intervention by an operator, providing for self-calibration and avoiding the need for periodic calibration, source checking and maintenance by personnel. The apparatus is comprised of one or more position sensitive proportional counters coupled together to act as a single counter. A computer based acquisition system is used to collect the time, energy and position of an ionization event that is caused by the contamination. Collimated radiation sources are located inside of each position sensitive proportional counter. These sources act as stable artifacts in the position and energy spectra that the device acquires as a function of time. The computer continuously adjusts parameters such as detector high voltage, amplifier gain and discrimination to keep the count rate, energy and position that the system measures for these check sources constant. This also corrects for drift and other variations that would cause the system to become misaligned. The apparatus has been built into conveyor systems for monitoring laundry and into portal monitors that are used to monitor workers exiting an area that is contaminated with radioactivity. It has also been used with wheels as a floor monitor and as a stand alone counter for direct monitoring of contamination.

30 Claims, 11 Drawing Sheets

U.S. PATENT DOCUMENTS

| | | | |
|---|---|---|---|
| 3,895,232 | 7/1975 | Schneeberger | 250/366 |
| 3,911,279 | 10/1975 | Gilland et al. | |
| 4,019,057 | 4/1977 | Bram | 250/375 |
| 4,320,299 | 3/1982 | Bateman et al. | 250/374 |
| 4,352,019 | 9/1982 | Pollard | 250/394 |
| 4,392,057 | 7/1983 | Mathieson et al. | |
| 4,400,621 | 8/1983 | Kiefer et al. | |
| 4,426,580 | 1/1984 | Smith | 250/374 |
| 4,431,921 | 2/1984 | Filthuth | 250/374 |
| 4,509,042 | 4/1985 | Kruse | 340/600 |
| 4,598,202 | 7/1986 | Koechner | 250/366 |
| 4,629,897 | 12/1986 | Lemonnier et al. | |
| 4,731,535 | 3/1988 | Bische et al. | 250/394 |
| 4,866,277 | 9/1989 | Johnson et al. | 250/385.1 |
| 5,180,917 | 1/1993 | Wraight | 250/374 |
| 5,440,135 | 8/1995 | Shonka | 250/374 |

OTHER PUBLICATIONS

Kalbitzer et al.; "On The Charge Dividing Mechanism In Position Sensitive Detectors"; 1967; pp. 301–304; Nuclear Instruments And Methods 56.

Miller et al; "A Position Sensitive Detector For A Magnetic Spectrograph"; 1971; pp. 389–396; Nuclear Instruments And Methods 91.

Mathieson et al; "Signal Location By Shorted RC Line"; 1974; pp. 139–149; Nuclear Instruments And Methods 121.

Mathieson et al.; "Signal Location By Open–Circuit RC Line"; 1975; pp. 199–204; Nuclear Instruments And Methods 126.

E. Mathieson; "Linearity And Noise Considerations For Position Sensitive Detectors"; 1971; pp. 171–176; Nuclear Instruments And Methods 97.

Fulbright et al.; "Position Sensitive Particle Detectors Used In A Magnetic Spectrometer"; 1973; pp. 125–133; Nuclear Instruments And Methods 108.

Borkowski et al.; "Design And Properties of Position–Sensitive Proportional Counters Using Resitance–Capacitance Position Encoding"; 1975; pp. 951–962; Rev. Sci. Instrum., vol. 46 No. 8.

Hough et al.; "Proportional Counters For The Localisation of Ionising Radiation"; 1972; pp. 365–372; Nuclear Instruments And Methods 103.

Ford, Jr. et al.; "A Position Sensitive Proportional Detector For A Magnetic Spectrograph"; 1972; pp. 199–203; Nuclear Instruments And Methods 98.

Doehring et al.; "On The Ballistic Deficit And The Signal–To–Noise Ratio Of Semiconductor Spectrometers For Energy And Position Spectroscopy"; 1968; pp. 40–44; Nuclear Instruments And Methods 59.

Williams et al; "Particle ID For A Position Sensitive Proportional Counter"; 1972; pp. 201–204; Nuclear Instruments And Methods 102.

Williams et al; "A Proportional Counter Telescope For Position Determination And Particle ID In A Magnetic Spectrograph"; 1971; pp. 13–16; Nuclear Instruments And Methods 93.

Borkowski et al; "New Type of Position–Sensitive Detectors of Ionizing Radiation Using Risetime Measurement"; 1968; pp. 1515–1522 The Review of Scientific Instruments, vol. 39 No. 10.

Kuhlmann et al.; "Ortsempfindliche Zählrohre"; 1966; pp. 118–120; Nuclear Instruments And Methods 40.

B. Greenberg; "A Locus–Sensitive Proportional Counter"; 1967; pp. 203–206; J. Sci. Instrum. vol. 44.

Anderson et al; "Low Deadtime Delay Line Readout For Position–Sensitive Proportional Counters"; Mar. 1974; pp. 1–2; US Atomic Energy Comm.

Lee et al; "A Bifilar Helical Multiwire Proportional Chamber For Position Sensitive Detection of Minimune Ionizing Particles"; 1972; pp. 179–188; Nuclear Instruments And Methods 104.

Gilland et al; "A Multiwire Proportional Counter With Integral Readout Delay Line"; 1972; pp. 241–243; Nuclear Instruments And Methods 104.

Borkowski et al; "Proportional Counter Photon Camera"; Jun. 1972; pp. 1–6—FIGS. 1–12; $13^{th}$ Scintillation And Semiconductor Counter Symposium, Washington, D.C.

M. K. Kopp; "Wide Band Low Noise Voltage Sensitive Preamplifier With Temp Compensation;" May 1971; pp. 714–715; The Review of Scientific Instruments, vol. 42, No. 5.

Gabriel et al; "A Position Sensitive Proportional Detector For X–Ray Crystallography"; Nov. 1972; pp. 1600–1602; The Review of Scientific Instruments vol. 43 No. 11.

Rindi et al; "Delay–Line Readout For Proportional Chambers;" 1970; pp. 325–327; Nuclear Instruments And Methods 77.

Alberi et al; "Position Sensing By Charge Division"; Feb. 1976; pp. 251–258; IEEE Transactions On Nuclear Science vol. NS 23 No. 1.

J. L. C. Ford, Jr.; "Position Sensitive Proportional Counters As Focal Plane Detectors"; Jun. 1979; pp. 277–304; Nuclear Instruments And Methods, vol. 162, Nos. 1–3, Part I.

J. Byrne et al; "Avalanche Chain Development in An Argon–Methane Proportional Counter"; 1970; pp. 286–292; Nuclear Instruments And Methods 79.

R. Bock et al; "An Array of Position Sensitive Surface Barrier Detector For Use In A Broad Range Magnetic Spectrograph"; 1966; pp. 190–194; Nuclear Instruments And Methods.

W. N. McDicken; "A Position Sensitive Geiger Counter;" 1967; pp. 157–158; Nuclear Instruments And Methods 54.

R. J. Buchanan et al; "Intelligent Automatic Gain Stabilization For Radiation Energy Spectra" (Publication Date Unknown).

C. J. Borkowski et al; "Some Appl. And Properties of One–And Two–Dimensional Position–Sensitive Prop. Counters;" pp. 340–349 (Publication Date Unknown).

C. J. Borkowski et al.; "Proportional Counter Photon Camera"; pp. 161–168; Oak Ridge National Laboratory; (Publ. Date Unknown).

Jack Sharpe; "Nuclear Radiation Detectors"; pp. 183–200; EMI Electronics Ltd. (Publication Date Unknown).

R. B. Owen et al; "One And Two Dimensional Position Sensing Semi–Conductor Detectors"; pp. 290–303; (Publication Date Unknown).

M. Lampton et al; "Delay Line Anode For Microchannel–Plate Spectrometer;" pp. 1–23; NASA Tech Briefs MFS–26073; George C. Marshall Flight Center; (Publication Date Unknown).

Papers Prepared by Joseph J. Shonka And his Representatives And Distributed Prior to Sep. 1, 1992.

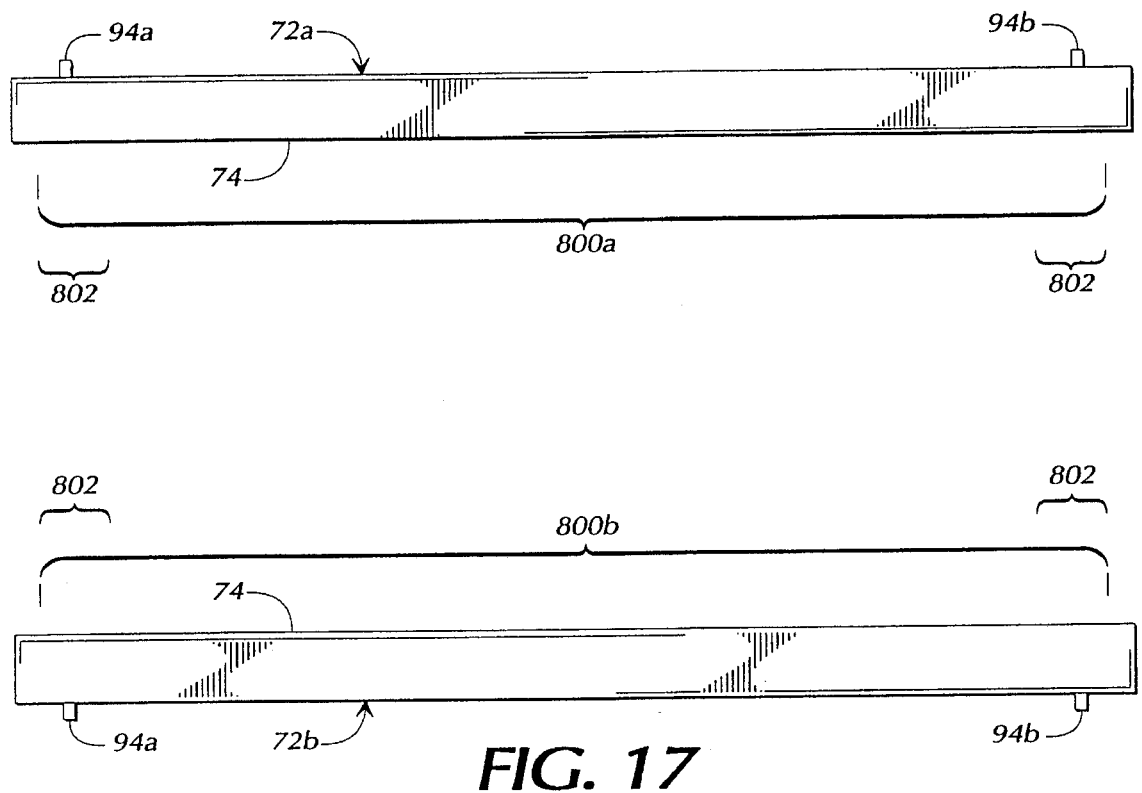

SELF-CALIBRATING RADIATION DETECTORS FOR MEASURING THE AREAL EXTENT OF CONTAMINATION

This application is a continuation of application Ser. No. 08/115,203, filed on Sep. 1, 1993.

BACKGROUND OF THE INVENTION

The present invention relates generally to the field of radiation contamination detection systems and, in its most preferred embodiments, to the field of position sensitive proportional counters.

In order to achieve a lower limit of detection for radioactive contamination detection systems, conventional contamination detection systems (laundry monitors, portal monitors, floor monitors, etc.) typically employ multiple separate radiation detectors in separate housings or separate radiation detectors located in a common housing. In these systems, each separate detector has a set of electronics dedicated solely to it. To align these systems, a technician must assure proper initial conditions (power supply voltages, etc.) and set amplifier gain, discriminator level (or levels for systems that measure more than one type of radiation) and high voltage for each separate detector to place the system into proper operating condition. In order to calibrate one of the detectors in the system, a measurement of the efficiency must be made, using a standardized source of radiation. This work must be repeated for each of the separate detectors. The number of separate detectors in a system can exceed 50, therefore the initialization and calibration of these systems can be quite cumbersome. Thus, it is not an easy matter to calibration these conventional systems. Calibration is typically performed at least annually, or when the system is found to be inoperable. Due to the infrequency of calibrations, high quality electronics must typically be used in conventional systems to minimize the effect of drifts from temperature, supply voltage changes and aging effects between calibrations.

Conventional contamination detection systems, having separate detector housings with discrete separate detectors therein, typically incorporate computers which test for gross system failure. The computers cannot identify system drifts, even if the system is no longer capable of detecting radiation at some predefined regulatory limit. To compensate for this, most sites with contamination monitoring systems perform a daily check that places a source of radiation near each of the separate detectors to confirm that the monitor operates properly and alarms. Regulatory agencies often require these checks to be quantitative. If the monitor fails to alarm, the system must be taken out of service for repair and re-calibration. Many man-hours are required to keep a single system operating due to the necessity of "checking" the discrete set of electronics associated with each separate detector. Additionally, if a system fails a daily source check, there is an ambiguity about when the failure occurred, and how much material was released without proper monitoring for contamination.

In one sense, monitoring is ideally accomplished by a large number of adjacent, small, separate detectors. This reduces the background count rate per detector and thus reduces each detector's, and thus the overall system's, detection limit. However, because of the man-hours required to calibrate, maintain and source check each separate detector in conventional contamination monitoring systems, and because of the cost of the electronics for each detector, it is prohibitive to sufficiently increase the number of separate detectors. Additionally, in conventional contamination monitoring systems sensitivity is decreased in the regions between detectors. Thus, there are limitations to the number of detectors that can feasibly be employed, and thus limitations to conventional contamination monitoring systems.

SUMMARY OF THE INVENTION

Briefly described, the present invention includes a radiation contamination detection system that effectively employs a single anode wire and a single set of electronics associated with the single anode wire, wherein the single anode wire effectively functions as a plurality of sub-detectors. The present invention further includes radiation sources within a detector housing through which the single anode wire passes, and the radiation sources are employed to facilitate automatic electronic alignment and automatic continuous calibration of the system.

The preferred embodiment of the present invention includes a radiation contamination detection system that is essentially a vastly improved position sensitive proportional counter. In accordance with the preferred embodiment of the present invention, the system includes a pair of elongated detectors, each having a trapezoidal profile. The trapezoidal shape provides maximum window area through which particles of radiation pass and are counted while maintaining an appropriate electric field necessary for the detector to maintain adequate energy resolution, regardless of particle trajectory. The detectors are disposed on either side of and transverse to a conveyer upon which potentially contaminated articles pass. When alpha or beta radiation emitted from contamination passing between the detectors enters one or both of the detectors, a charge is deposited upon an anode wire within a detector. The anode wires of the upper and lower detectors are "jumpered" together such that there is effectively one elongated anode wire. The charge deposited upon the anode wire travels to either end of the wire, and by using position sensitive proportional counting techniques, the position along the anode wire upon which the charge was deposited is determined. In accordance with the preferred embodiment of the present invention, the position is determined by employing a charge division method. In accordance with other embodiments, a time division method is employed.

Use of position sensitive proportional detectors allows a single detector housing and anode wire to comprise many radiation detection elements, each of which acts as a separate radiation detector. The detection elements can be summed into virtual radiation detection zones of arbitrary size and configuration, including multiple and overlapping zones. The overlapping zones lose no efficiency due to edge effects, as occurs with conventional radiation detectors. The detector can be extended beyond the edge of the surface being monitored for contamination and avoid the lost efficiency observed with conventional systems due to edge effects that occur when a conventional detector does not overlap the surface being monitored.

Small collimated radiation sources are incorporated into the detector housings. These sources are designed to irradiate a small section of the detector, providing a constant radiation source of known intensity and energy characteristics. This provides a stable artifact in the position and energy spectra of the detector. While operating, adjustment can be made to detector high voltage to maintain the energy of the check source radiation at the same value or location in the energy spectra. Small changes in amplifier gain (which shift the location of the internal check sources in the position spectra) can either be corrected digitally or by analog control of the amplifier gain. This stabilizes the system from the effects of drifting electronics, and provides for self calibration of the radiation detectors.

The internal collimated sources are also used to correct the discriminator levels of the electronics. Periodically during operation, in particular during the acquisition of background counts, the computer supplied voltage reference that controls the lower level discriminators can also be adjusted to maintain the number of events (or intensity) of the internal check sources constant. When coupled with the high voltage and amplifier gain stabilization discussed above, the additional control of the lower discriminators provides for fully automating the maintenance of calibration of the system without the need for intervention of a calibration technician.

It is therefore an object of the present invention to provide an improved radiation contamination detection system and method.

Another object of the present invention is to provide a radiation detector in which a single anode wire functions as a plurality of sub-detectors.

Yet another object of the present invention is to provide a radiation detector that includes radiation sources therein.

Still another object of the present invention is to provide a collimated source.

Still another object of the present invention is to employ radiation source within a radiation monitor to facilitate automatic and continuous electronic alignment.

Still another object of the present invention is to provide a single large radiation monitor that functions as multiple discrete monitors.

Still another object of the present invention is to provide for the effective "mapping" of contamination.

Still another object of the present invention is to evaluate the degree of contamination by calculating discrete, overlapping detection zones.

Still another object of the present invention is to differentiate between general contamination spread over a general area and smaller areas.

Still another object of the present invention is to identify single, discrete, intensely radioactive "hot particles".

Other objects, features and advantages of the present invention will become apparent upon reading and understanding this specification, taken in conjunction with the accompanying drawings.

BRIEF DESCRIPTION OF THE DRAWINGS

FIG. 17 is a schematic representation of the detectors and channels in the position spectra defined relative thereto.

FIG. 18 is a schematic representation of overlapping virtual zones.

DETAILED DESCRIPTION OF THE PREFERRED EMBODIMENTS

Figure 1:
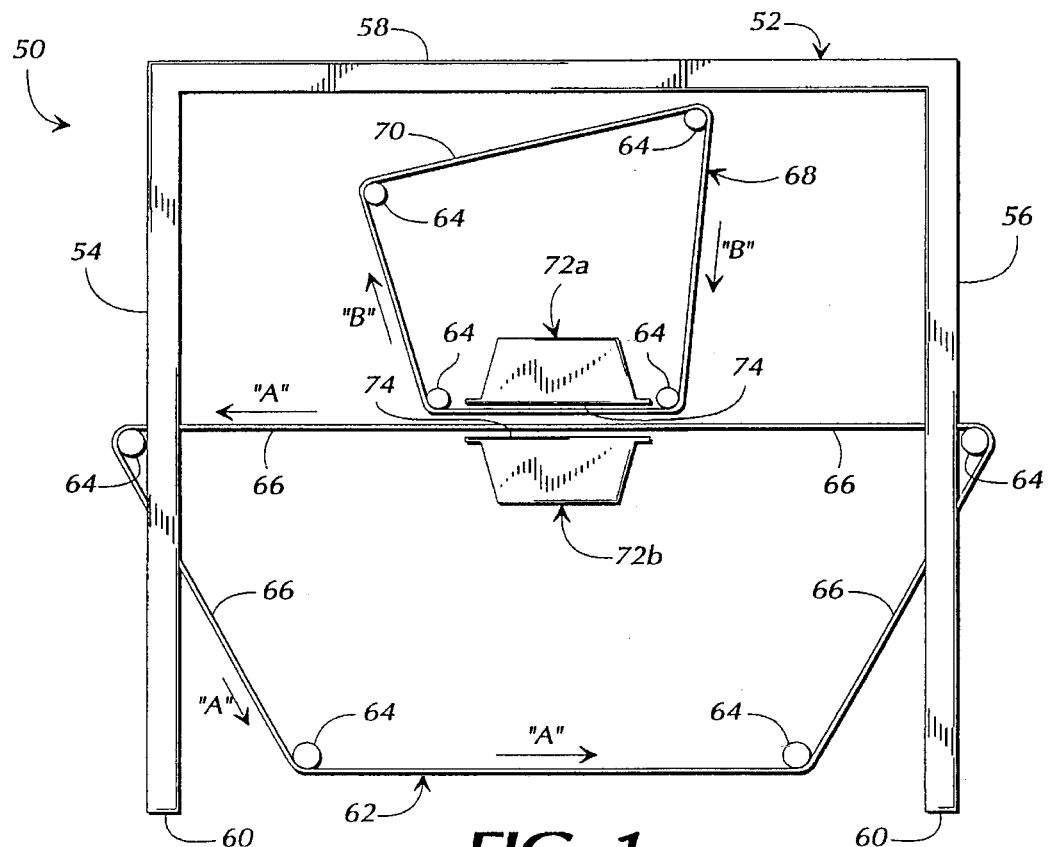
FIG. 1 is a side, schematic representation of portions of a conveyerized laundry monitor, in accordance with the preferred embodiment of the present invention.

Referring now in greater detail to the drawings, in which like numerals represent like components throughout the several views, FIG. 1 shows a side, schematic representation of portions of a conveyerized laundry monitor 50, in accordance with the preferred embodiment of the present invention. The conveyerized laundry monitor 50 includes a conventional frame 52 having a front 54, rear 56, top 58 and bottom 60. The monitor 50 further includes a lower conveyer assembly 62 that is connected to the frame 52 and is conventional in construction and operation. The lower conveyer assembly 62 includes a plurality of roller mechanisms 64 around which a continuous lower conveyer belt 66 travels. The monitor 50 further includes a drive mechanism (not shown) for moving belt 66 in the direction indicated by arrows "A". The monitor 50 further includes an upper conveyer assembly 68 that is connected to the frame 52 and is conventional in construction and operation. The upper conveyer assembly 68 includes a plurality of roller mechanisms 64 around which a continuous upper conveyer belt 70 travels. The upper conveyer belt 70 is driven, in a conventional manner, in the direction indicated by arrows "B". In accordance with the preferred embodiment of the present invention, the separation distance between the upper conveyer belt 70 and the lower conveyer belt 66 is adjustable by jacking screws or other mechanical means not shown. These means promote the flattening of objects on the belt 66 and thus facilitate contamination detection. The drive mechanism mentioned in reference to the lower conveyer assembly 62 also provides drive for the upper conveyer belt 70 such that the belts 66,70 operate at the same speed. In accordance with the preferred embodiment of the present invention, the monitor 50 further includes radiation detectors 72a,b suspended above and below, respectively the lower conveyer belt 66 as shown. Each radiation detector 72a,b includes a window 74, and, in accordance with the preferred embodiment of the present invention, the windows 74 are oriented opposite from one another, as shown. In accordance with the preferred embodiment of the present invention the detectors 72 are housed within a housing (not shown) that is supported by the frame 52, and the ends of the detectors 72 extend beyond the edges of the belts 66,70. The housings not only support the detectors, they partially enclose the detectors 72 to minimize the detection of unwanted background radiation and leaving the windows 74 uncovered to maximize detection of the contamination that is of interest. In accordance with the preferred embodiment of the present invention, the belts 66,70 are, as an acceptable example, stainless steel wire belts.

Figure 2:
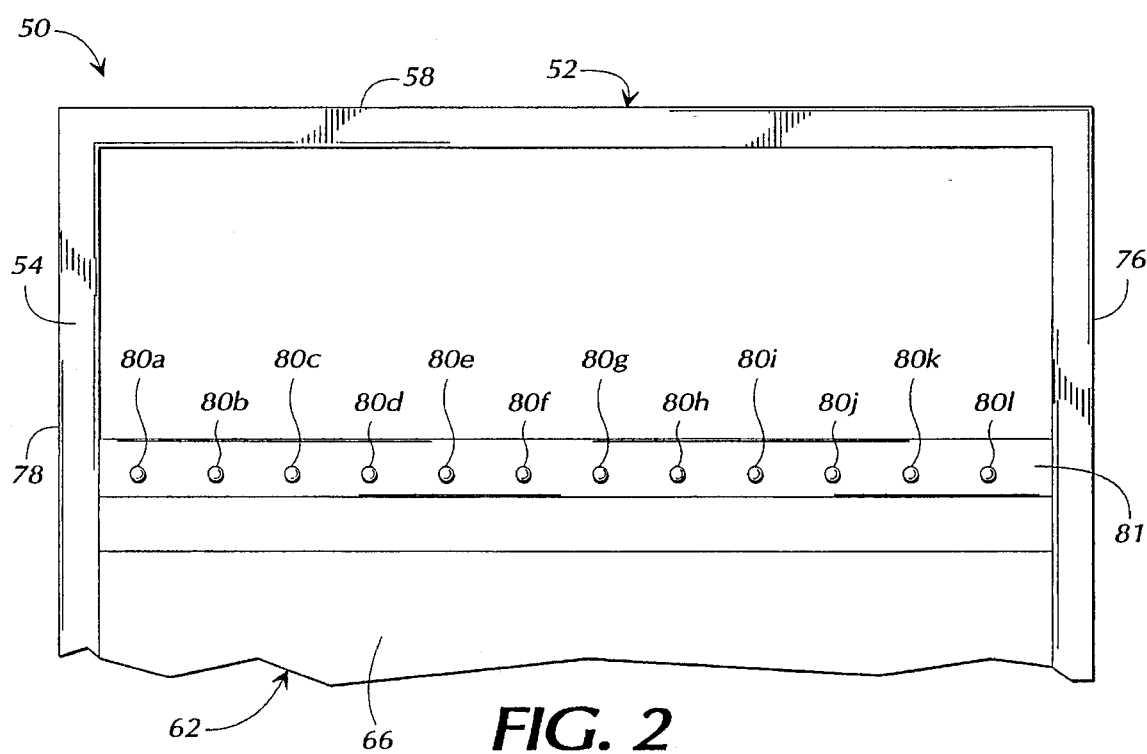
FIG. 2 is a front, schematic, cut-away representation of portions of the conveyerized laundry monitor of FIG. 1.

FIG. 2 is a front, schematic, cut-away representation of portions of the conveyerized laundry monitor 50, in accordance with the preferred embodiment of the present invention. Portions of the monitor 50 are not shown in FIG. 2 in an effort to clarify the figure. As shown, the monitor 50 further includes a right side 76 and left side 78. The monitor 50 further includes a plurality of indicators 80a–l extending between the sides 76,78 in a zonal fashion. The indicators 80 are shown attached to the frame 52, for example, by a crossmember 81. In accordance with the preferred embodiment of the present invention, the crossmember 81 is actually part of the housing (which was discussed with reference to FIG. 1) that supports the upper radiation detector 72a. In accordance with the preferred embodiment of the present invention, acceptable indicators 80 are light-emitting diodes (LEDs) or some other type of conventional illuminating assembly.

Figure 3:
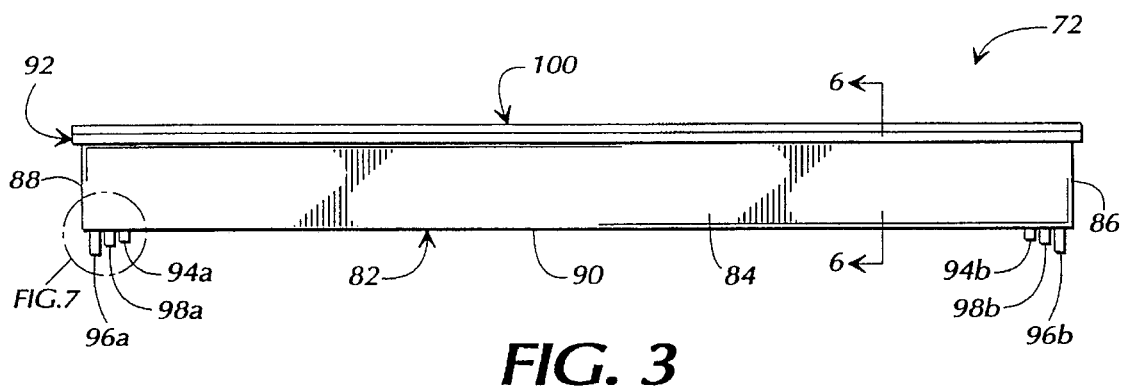
FIG. 3 is an isolated front view of a radiation detector of the monitor of FIG. 1, in accordance with the preferred embodiment of the present invention.

Referring back to FIG. 1, in accordance with the preferred embodiment of the present invention, the radiation detectors 72a,b are of identical construction. Using the orientation of the lower radiation detector 72b as a reference, FIG. 3 is an isolated front view of a radiation detector 72 in accordance with the preferred embodiment of the present invention. In accordance with the preferred embodiment of the present invention, the radiation detector 72 includes a detector body 82 including a front panel 84, right panel 86, left panel 88, bottom panel 90, and top flange 92. The detector 72, in accordance with the preferred embodiment of the present invention, further includes a pair of radiation sources 94a,b, gas nipples 96a,b, and electrical connectors 98a,b extending through the bottom panel 90 as shown. The detector 72 further includes sealing flange 100 connected to the top flange 92.

Figure 4:
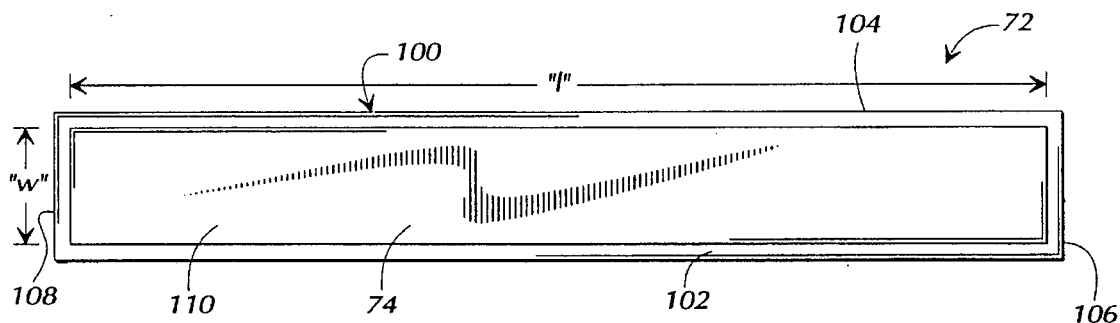
FIG. 4 is an isolated top view of the radiation detector of FIG. 3.

FIG. 4 is an isolated top view of the radiation detector 72 in accordance with the preferred embodiment of the present invention. As shown, the sealing flange 100 is rectangular in shape and includes a front strip 102, rear strip 104, right strip 106, and left strip 108. The window 74 is defined between the strips 102, 104, 106, 108. The window 74 is defined by a sheet 110 that is secured between the sealing flange 100 and the top flange 92, as is discussed in greater detail below. As shown, the window 74 defines a length "l" and a width "w".

Figure 5:
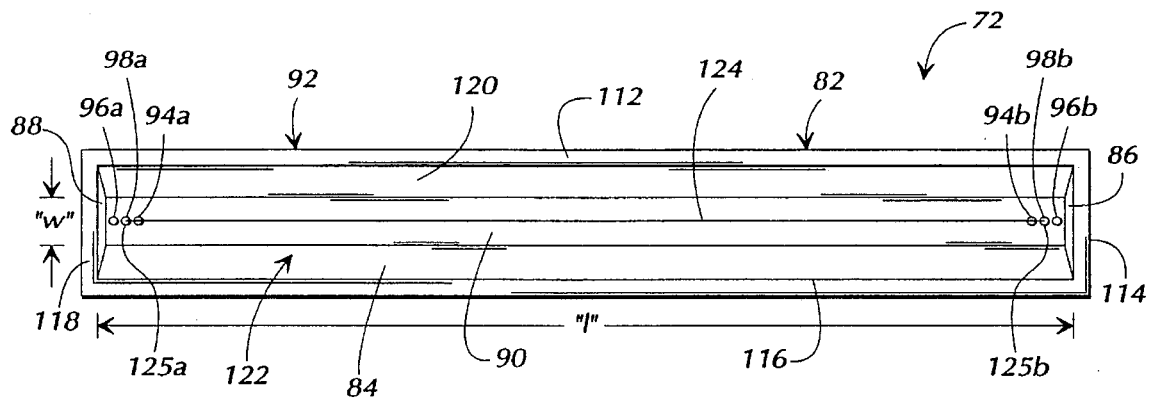
FIG. 5 is an isolated top view of the radiation detector of FIG. 3, with portions removed therefrom.

FIG. 5 is an isolated top view of the radiation detector 72 in accordance with the preferred embodiment of the present invention, with the sealing flange 100 (FIG. 4) and sheet 110 (FIG. 4) removed therefrom. As shown, in accordance with the preferred embodiment of the present invention, the detector body 82 defines a trapezoidal shape (see also FIG. 6). In accordance with the preferred embodiment of the present invention, the length "l" of the bottom panel 90 is identical to the length "l" of the window 74 (FIG. 4), and the width "w" of the bottom panel 90 is less than the width "w" of the window 74. The top flange 92 includes lips 112, 114, 116, 118. Panel 84 extends between the inner edge of lip 116 and an outer edge of the bottom panel 90, as shown. Panel 86 extends between the inner edge of lip 114 and an outer edge of the bottom panel 90, as is shown. Panel 88 extends between the inner edge of lip 118 and an outer edge of the bottom panel 90, as is shown. The detector body 82 further includes a rear panel 120 extending between the inner edge of lip 112 and an outer edge of the bottom panel 90, as is shown. In accordance with the preferred embodiment of the present invention, panels 84,86,88,90,120 define a detector cavity 122. As shown, the sources 94, gas nipples 96, and electrical connectors 98 penetrate the bottom panel 90 and extend into the detector cavity 122. Each source 94, gas nipple 96, and connector 98 is positioned close to its respective panel 86,88 so as to maximize the active region of the detector 72. In accordance with the preferred embodiment of the present invention, the sources 94, gas nipples 96, and electrical connectors 98 penetrate the bottom panel 90 in a substantially air-tight manner. A wire extends through the detector cavity 122. As discussed in greater detail below, the wire 124 is suspended between the electrical connectors 98 and makes contact only with the connectors 98. The wire 124 includes opposite ends 125a,b that are connected to connectors 98a,b respectively. When a detector 72 is located within the monitor 50 (FIG. 1), the ends of the detector extend beyond the edges of the belts 66,70 (FIG. 1) such that contaminated material on the belt 66 will generally not effect the wire 124 in the region of the source 94, and thereby interfere with calibrations that are based upon the sources 94, which are discussed below. In accordance with the preferred embodiment of the present invention, the sheet 110 (FIG. 4) covers the detector cavity 122, and edges of the sheet 110 are sandwiched between the sealing flange 100 (FIGS. 3 and 4) and the top flange 92. In accordance with the preferred embodiment of the present invention, two sided tape (not shown) is disposed as a gasket between the sheet 110 and the flanges 92,100, and the flanges are securely connected to one another by nuts (not shown) and screws (not shown) in a manner that renders the detector cavity 122 substantially air-tight (with the exception of the passage defined through the gas nipples 96).

Figure 6:
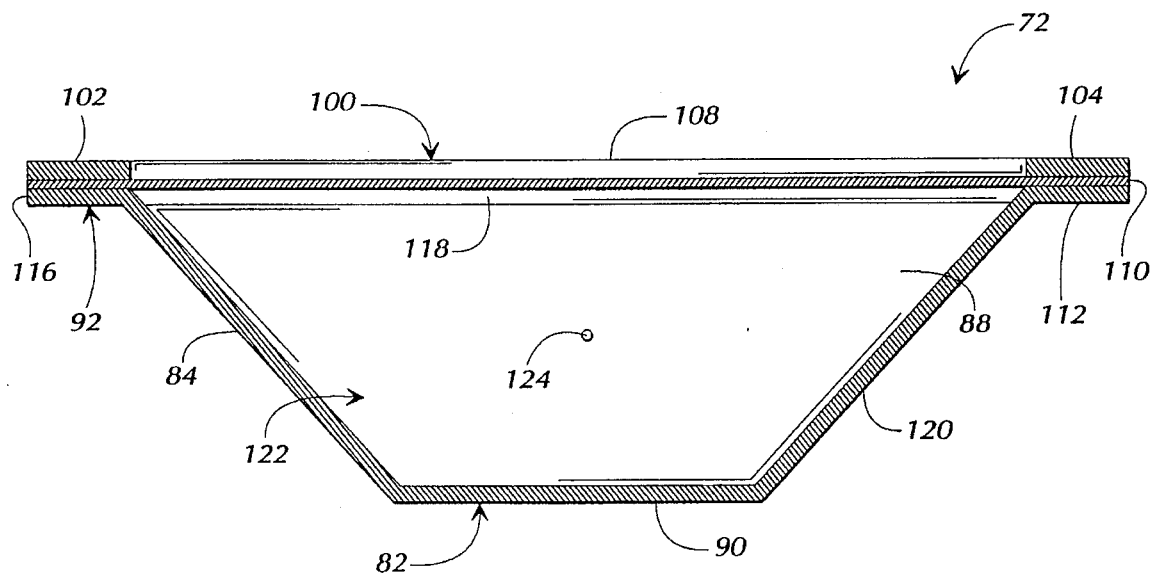
FIG. 6 is an isolated cross-sectional view of the detector of FIG. 3, taken along line 6—6 of FIG. 3, and with portions removed therefrom.

FIG. 6 is an isolated cross-sectional view of the detector 72 taken along line 6—6 of FIG. 3. The source 94a, gas nipple 96a, and electrical connector 98a are not shown in FIG. 6 in an effort to clarify the view. Also, the thickness of the sheet 110 is exaggerated in an effort to clarify the view. FIG. 6 clearly shows the trapezoidal shape of the detector 72. FIG. 6 further shows the position of the wire 124 within the detector cavity 122. The wire 124 is substantially centered vertically and horizontally within the trapezoidal cross section of the detector cavity 122 as it is oriented in FIG. 6. As discussed in greater detail below, the trapezoidal shape and placement of the anode wire 124 are thought to enhance and inventively contribute to the operation of the detector 72.

Figure 7:
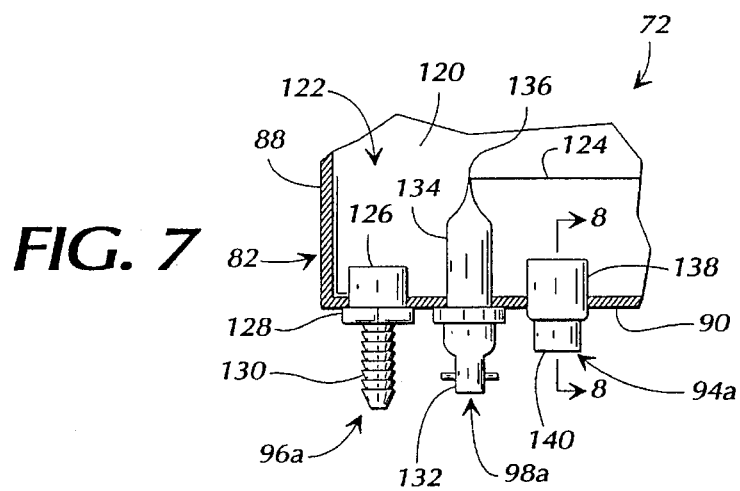
FIG. 7 is an isolated, enlarged, cut-away view of the portion of the detector identified in FIG. 3.

FIG. 7 is an isolated, enlarged, cut-away view of the portion of the detector identified in FIG. 3. In FIG. 7, the source 94a, gas nipple 96a, and electrical connector 98a are shown penetrating the bottom panel 90. In accordance with the preferred embodiment of the present invention the gas nipples 96 are conventional and includes a threaded base 126, a nut portion 128, and a ribbed portion 130. The threaded base 126 is threadedly engaged to and through the bottom panel 90, and the nipple 96 defines a flowpath (not shown) through the body 142 (FIG. 8) such that upon attachment of a tube (not shown) to the ribbed portion 130, the tube is in fluid communication with the detector cavity 122. In accordance with the preferred embodiment of the present invention, an electrical connector 98 has a cable connector end 132, and an insulator 134 and solder post 136 extending from the end 132 into the detector cavity 122. The connector 98 is connected to the detector 72 such that the detector body 82 is grounded while the solder post 136 is at a potential above ground when power is applied to the end 132. The wire 124 is soldered to the solder post 136. In accordance with the preferred embodiment of the present invention, acceptable connectors 98 are, for example, co-axial high voltage bulkhead connectors of MHV or SHV type. The sources 94 include a threaded base 138 that is threadedly engaged through the bottom panel 90 and extends into the detector cavity 122, and a nut portion 140 that remains outside of the cavity 122.

Figure 8:
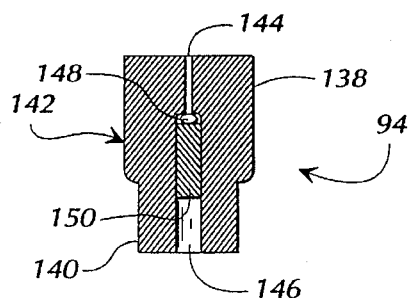
FIG. 8 is an isolated, cross-sectional view of a source that is part of the detector of FIG. 3, wherein the cross-section is taken along line 8—8 of FIG. 7.

FIG. 8 is an isolated, cross-sectional view of the source 94 taken along line 8—8 of FIG. 7, in accordance with the preferred embodiment of the present invention. The source 94 includes a body 142 that includes the threaded base 138 and nut portion 140. The body 142 defines a collimating bore 144 and a plug bore 146 that together define a passage therethrough. The collimating bore 144 has a lesser diameter than the plug bore 146. A source 148 is disposed within the plug bore 146 adjacent to the collimating bore 144, and a set screw 150 is threadedly disposed within (i.e., the set screw 150 is capable of being threaded into and out of) the plug bore 146 so as to selectively secure the source 148 therein. In accordance with the preferred embodiment of the present invention, the body 142 is a small brass pipe plug of one quarter inch national pipe thread size. In accordance with the preferred embodiment of the present invention, the source 148 is a small metal disk which has an electroplated finish of one micro curie of Americium-241 and is similar to sources used in common household ionization type smoke detectors. The collimating bore 144 restricts and causes the radiation given off by the source 148 to be collimated. The source 94 is fabricated and installed in the detector body 82 (FIG. 7) such that the radiation emitted by source 148 is effectively "aimed" directly at a short segment of wire 124 (FIG. 7) oriented directly above the source 94. The source 148 is designed to restrict the radiation given off by the source 148 to a small section of wire 124 and to provide a low number of source (e.g., alpha) particles. In accordance with the preferred embodiment of the present invention, the number of source particles are approximately ten per second. As discussed in greater detail below, the sources 94 provide a stable artifact in the computerized position and energy spectra.

Referring back to FIGS. 3–6, in accordance with the preferred embodiment of the present invention, the detector body 82 is acceptably constructed from metal. In accordance with the preferred embodiment of the present invention, the detector body 82 is fabricated from a sheet of stainless steel. As discussed above, in accordance with the preferred embodiment of the present invention, the detector body 82 is trapezoidal in shape. Referring to FIGS. 4 and 5, acceptable examples of the window 74 length "l" and a width "w" are six and a half feet, and five inches, respectively. Acceptable examples of the length "l" and width "w" of the bottom panel 90 are six and a half feet, and two inches, respectively. The trapezoidal shape is thought to provide an optimum heuristic trade-off in that it provides a reasonably uniform electric field to collect the initial ionization created by radiation that enters the detector 72 and minimizes the "dead" or unused space in the counter for a given window 74 width "w", thus reducing the amount of gas needed and the length of time required to purge the detector 72 during initial operation (as discussed in greater detail below). Detectors 72 of various dimensions are within the scope of the present invention.

Referring back to FIGS. 4 and 6, the sheet 110 is preferably a thin, gas impervious, electrically conductive sheet that allows for the passage of alpha and beta radiation therethrough. An acceptable sheet is, for example, the material known as aluminized MYLAR (i.e., sheet 110). The MYLAR (i.e., sheet 110) has vacuum deposited aluminum on both sides thereof. The aluminum provides an electrically conductive surface and assists in sealing any pin holes that might be present in the MYLAR (i.e., sheet 110). Thin aluminized MYLAR (i.e., sheet 110) having an areal density of less than 0.85 mg/cm$^2$ is preferred. An acceptable MYLAR (i.e., sheet 110) is available from Alexander Vacuum Research, Inc. of Greenfield, Mass. as their type C(2) Film (0.00024" polyester film vacuum metalized on both sides with aluminum, 0.85 mg/cm$^2$). Referring to FIG. 7, acceptable examples of the co-axial high voltage bulkhead connectors 132 are types MHV or SHV, which are readily available. Referring to FIGS. 5 and 7, the wire 124 is preferably a conductive wire that is highly resistive. In accordance with the preferred embodiment of the present invention, the wire 124 is chosen such that it is capable of achieving a 5,000 to 50,000 ohms resistance, while obtaining sufficient tensile strength. In accordance with the preferred embodiment of the present invention, an acceptable example of wire 124 is stainless steel wire having a diameter of from 0.0003" to 0.003". While stainless steel wire 124 is suitable for the preferred embodiment, greater resistance materials (e.g. nichrome wire and other specialty alloys) and smaller diameters are used to provide greater resistance per unit length of wire 124 in certain detectors 72 of lesser lengths "l" (FIGS. 4 and 5).

Figure 9:
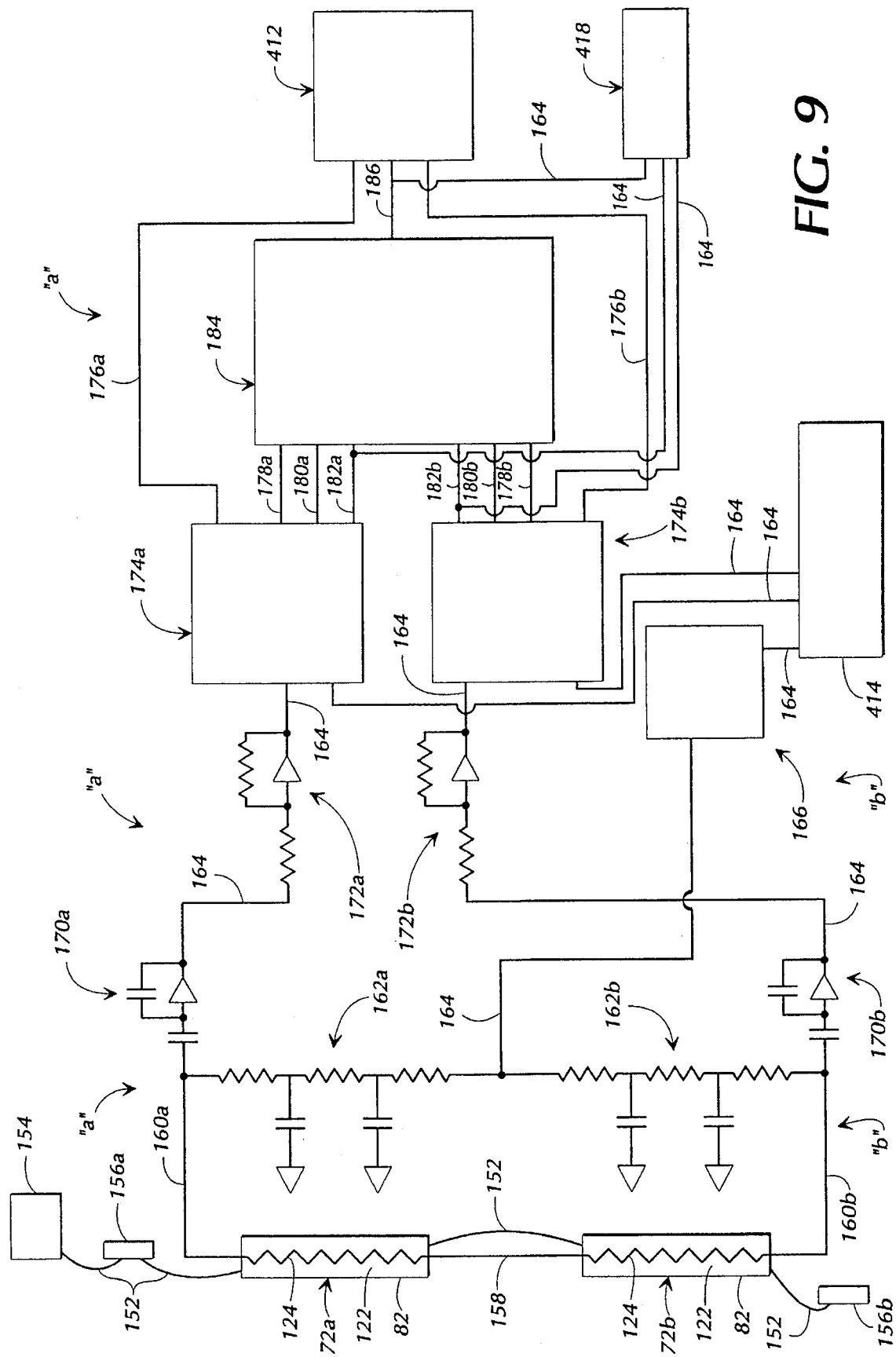
FIG. 9 is a combined block diagram and schematic representation of a portion of the electronic components of the monitor of the present invention, in accordance with the preferred embodiment of the present invention.

FIG. 9 is a combined block diagram and schematic representation of a portion of the electronic components of the monitor 50 of the present invention, in accordance with the preferred embodiments of the present invention. The detectors 72a,b are shown with the wire 124 (cathode) and body 82 (anode) represented. In accordance with the preferred embodiment of the present invention, tubing 152 connects a counting gas supply 154 to the cavities 122 (FIGS. 5, 6, and 7) such that a gas flowpath is defined from the gas supply 154, through a flow meter 156a, through the cavity 122 of detector 72a, and then through the cavity of detector 72b, and then through a flow meter 156b. The tubing 152 connects to the gas nipples 96 (FIGS. 3, 5, and 7). A jumper cable 158 electrically connects the two detectors 72 and cables 160a,b electrically connect to the detectors 72 at the ends opposite the jumper cable 158, as is shown. The cables 158,160 are attached to connectors 98 (FIGS. 3, 5, and 7). Cable 160a partially defines a channel "a" and cable 160b partially defines a channel "b".

In accordance with the preferred embodiment of the present invention, cable 160a extends from detector 72a and connects to a high voltage divider network 162a, and cable 160b extends from detector 72b and connects to another high voltage divider network 162b. The divider networks 162 are connected by wiring 164 to a high voltage power supply 166. In accordance with the preferred embodiment of the present invention, the high voltage power supply 166 is in turn powered by a low voltage DC power supply (not shown) and is computer controlled by way of wiring 164 connected to an analog output card 414 (see also FIG. 11). The cable 160a extending from detector 72a also connects to a charge sensitive pre-amplifier 170a that is a part of channel "a". Similarly, the cable 160b extending from detector 72b also connects to a charge sensitive pre-amplifier 170b that is part of channel "b".

In accordance with the preferred embodiment of the present invention, wiring 164 connects the output of charge sensitive pre-amplifier 170a to a filter amplifier 172a which is part of channel "a". Similarly, wiring 164 connects the output of charge sensitive pre-amplifier 170b to a filter amplifier 172b which is part of channel "b". Wiring 164 connects the output of filter amplifier 172a to the input of a peak detection circuit with a sample and hold 174a (referred to hereafter as a sample and hold amplifier or SHA), which is part of channel "a". Wiring 164 connects the output of filter amplifier 172b to the input of a peak detection amplifier with sample and hold (SHA) 174b, which is part of channel "b". Also connected to an input of SHA 174a is wiring 164 connected to the analog output card 414. Similarly, also connected to an input of SHA 174b is wiring 164 connected to the analog output card 414. Connected to the output of SHA 174a is an output wire 176a, which is part of channel "a", that connects to the analog input card 412 (see also FIG. 11). Connected to the output of SHA 174b is an output wire 176b, which is part of channel "b", that connects to the analog input card 412 (see also FIG. 11).

Also connected to the output of SHA 174a is a gate wire 178a (connected to gate output). Connected to the input of SHA 174a is a strobe wire 180a (connected to strobe input) and busy wire 182a (connected to busy input). Similarly, also connected to the output of SHA 174b is a gate wire 178b (connected to gate output). Connected to the input of SHA 174b is a strobe wire 180b (connected to strobe input) and busy wire 182b (connected to busy input). The wires 182 connect to the input of a coincidence logic circuit 184. The wires 178,180 return from the coincidence logic circuit 184 to the SHAs 174. A trigger wire 186 extends from the output of the coincidence logic circuit 184 and connects to the analog input card 412. Separate wires 164 extend separately from a counting card 418 to busy wire 182a, busy wire 182b, and the trigger wire 186.

In accordance with the preferred embodiment of the present invention, an acceptable coincidence logic circuit 184 functions to determine if a pair of pulses "a","b" arriving at the SHAs 174 arrive within a period or window of time (relative to one another) that indicates that the pulses "a","b" originated from a common alpha or beta ionizing event within a detector 72. The originating of pulses "a","b" is discussed in greater detail below. If pulses originating from a common ionizing event are detected, the circuit 184 performs several logical functions: (1) the circuit 184 signals the SHAs 174, by way of gate wires 178, causing the SHAs 174 to reject all "new" pulses until the "present" pulses "a","b" are processed; (2) the circuit 184 signals the SHAs 174, by way of the strobe wires 180, causing the SHAs to provide pulse height data for pulses "a","b" through the output wires 176 to the analog input card 412; (3), the circuit 184 signals the analog input card 412, by way of the trigger wire 186, to read the pulse height data for pulses "a","b" provided through the output wires 176. The counting card 418 is also connected by wiring 164 to the trigger wire 186.

Referring further to FIG. 9, in accordance with the preferred embodiment of the present invention, an acceptable gas 154 is a gas that provides for proportional counter operation when subjected to alpha or beta radiation in the presence of a high electric field, such as, for example P10 counting gas (composed of 90% argon and 10% methane gas). Acceptable tubing 152 is, for example, TYGON tubing.

With respect to the electronic components, in accordance with the preferred embodiment of the present invention, they are selected and operated such that the monitor 50 operates in a limited proportionality range, where events from alpha radiation are gas gain limited while the events from beta radiation are not. This permits the detector to count both alpha radiation which deposits a few million electron volts of energy in the gas 154 and also beta radiation which deposits roughly a 100 times less energy.

More specifically, an acceptable example of cables 160 are high voltage co-axial cables. An acceptable example of the high voltage power supply 166 is a power supply capable of providing a DC output of from 0 to 2,000 volts. Also, the output is preferably readily capable of being computer controlled. An acceptable example of power supply 166 is a BERTAN PMT-20C/P power supply available from Bertan Associates, Inc. of Hicksville, N.Y. In accordance with the preferred embodiment of the present invention, the high voltage divider networks 162 and charge sensitive pre-amps 170 are acceptably part of a single preamplifier module, an acceptable example of which is an EG&G ORTEC Model 142PC available from EG&G ORTEC in Oak Ridge, Tenn. In accordance with the preferred embodiment of the present invention, the filter amplifiers 172 are acceptably part of a single Nuclear Instrumentation Module, an acceptable example of which is an OXFORD TENNELEC Model TC247, available from Oxford Tennelec in Oak Ridge, Tenn.

Figure 10:
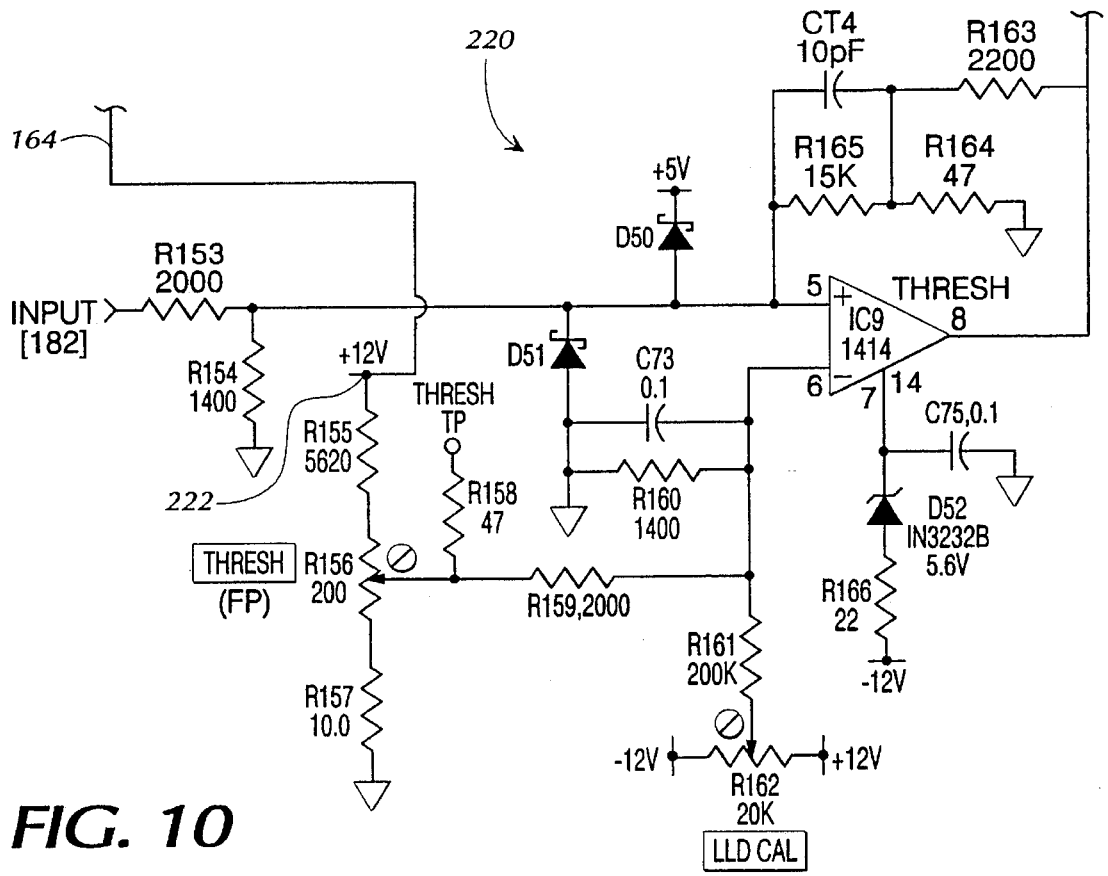
FIG. 10 is an electrical schematic representation of a portion of a component identified in FIG. 9, in accordance with the preferred embodiment of the present invention.

In accordance with the preferred embodiment of the present invention, the peak detection amplifiers with sample and hold (SHA) 174 are capable of discriminating. The SHAs 174 function to discriminate pulses whose amplitude is below a noise level, and thereby eliminate time wasted on analyzing noise pulses. The peak detection amplifiers with sample and hold (SHA) 174 are acceptably part of a single Nuclear Instrumentation Module, an acceptable example of which is a Dual Linear Gate and Stretch such as the OXFORD TENNELEC TC310 available from Oxford Tennelec in Oak Ridge, Tenn. More preferably, a Dual Linear Gate and Stretch that allowed for the direct computer control of discrimination would be employed . The OXFORD TENNELEC TC310 does not allow for direct computer control of discrimination and therefore it must be slightly modified. FIG. 10 is an electrical schematic of a portion of the control logic input discriminator 220 of one channel of an OXFORD TENNELEC TC310. As indicated with reference to FIGS. 9 and 10, in order to achieve computer control of the discrimination of the OXFORD TENNELEC TC310, wiring 164 from the analog output card 414 is connected to the voltage reference 222 of the control logic 220 of the OXFORD TENNELEC TC310, replacing the constant twelve volt reference.

In accordance with certain embodiments of the present invention, there are combinations of anode wire 124 (FIGS. 5–7) resistances and detector 72 length "l" (FIG. 5) for which the electronics of the present invention will exhibit undesirable non-linearaties. Methods for improving the linearity have been studied and reported in the scientific literature on position sensitive detectors and include varying (typically increasing) the feedback capacitance on the charge sensitive preamplifiers 170 (FIG. 9), adding small resistors (a few hundred ohms) to the input of the charge sensitive preamplifiers 170 (FIG. 9), using small values for the shaping time constants of the filter amplifiers 172 (FIG.

9), and using small feedback resistance (not shown) in the charge sensitive preamplifiers 170 (FIG. 9). An alternative to the above modifications is increasing the resistance of the wire 124 (FIGS. 5–7) by, for example, decreasing the diameter thereof.

Figure 11:
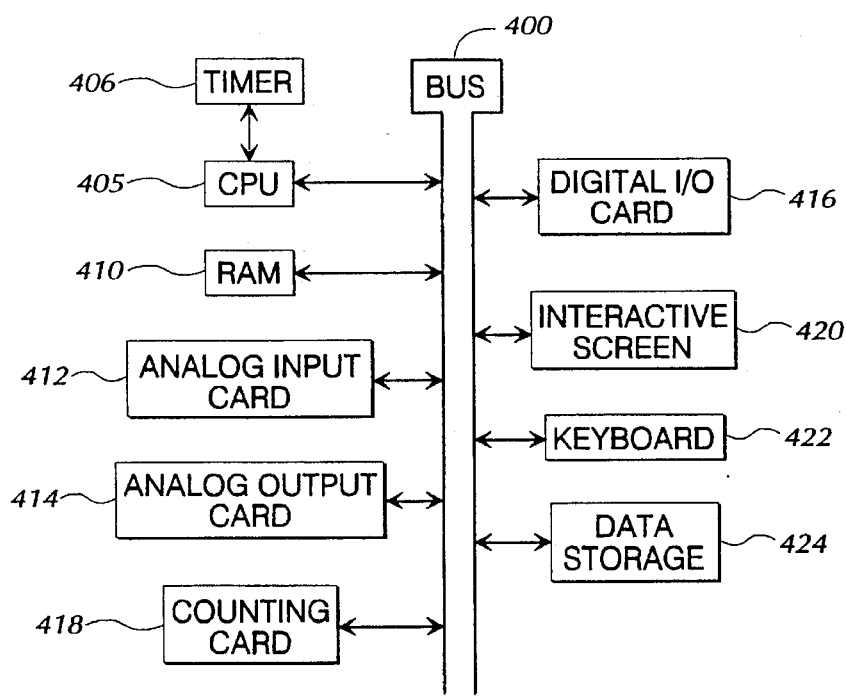
FIG. 11 is an electrical block diagram representation of a portion of the electronic components of the monitor of the present invention, in accordance with the preferred embodiment of the present invention.

FIG. 11 is a block diagram of components interfacing with a computer bus 400. In accordance with the preferred embodiment of the present invention, the computer bus 400 is that of a conventional personal computer such as, for example, an IBM or IBM compatible personal computer. Interfacing with the bus 400 is a conventional central processing unit 405 that includes an internal timer 406, and a conventional random access memory 410. Also interfacing with the bus 400 is an analog input card 412. Also interfacing with the bus 400 is an analog output card 414. Also interfacing with the bus 400 is a digital input/output card 416. Also interfacing with the bus 400 is the counter card 418. An interactive "touch" screen monitor 420 and keyboard 422 interact with the bus 400 in a manner that should be understood by those reasonably skilled in the art. Similarly, a data storage device 424 interacts with the bus 400 in a conventional manner. Acceptable data storage devices are, for example, a battery backed-up static random access memory, an internal hard drive, and an external drive and diskette.

An acceptable analog input card 412 is the CIO-DAS1400 available from Computer Boards, Inc. of 125 High Street, Mansfield, Mass. 02048. An acceptable analog output card 414 is the CIO-DDA06/12, which is also available from Computer Boards, Inc. of 125 High Street, Mansfield, Mass. 02048. An acceptable digital input/output card 416 is the CIO-DIO24H, which is also available from Computer Boards, Inc. of 125 High Street, Mansfield, Mass. 02048. An acceptable counter card 418 is the CIO-CTR05, which is also available from Computer Boards, Inc. of 125 High Street, Mansfield, Mass. 02048.

OPERATION

Referring back to FIG. 1, in accordance with the preferred embodiment of the present invention, articles (such as, for example, articles of clothing) (not shown) that are potentially contaminated with radioactive materials are placed on the lower conveyer belt 66 of monitor 50. The articles pass between the detectors 72 and if a particular article is contaminated, alpha and/or beta radiation is emitted from the contamination through one or both windows 74. When the electronics (FIGS. 9 and 10) of the monitor 50 are operating in a certain manner (discussed above and below) and gas 154 (FIG. 9) is properly flowing through and filling the detector cavities 122 (FIGS. 5, 6, and 7), such radiation causes a charge to be deposited on the anode wire 124 (FIGS. 5, 6, and 7) of detector 72a or detector 72b.

Referring back to FIG. 9, when a charge is deposited upon the wire 124, the charge splits such that one pulse caused by the charge (referred to as pulse "a") travels along channel "a" while another pulse caused by the charge (referred to as pulse "b") travels along channel "b". The pulses "a","b" arrive at the SHAs 174 having voltage potentials that are a function of the position at which the contamination responsible for pulses "a","b" passed relative to the detectors 72. The SHA's sending of a pair of pulses "a","b" to the analog input card 412 (FIG. 11) is dependent upon the coincidence logic circuit 184, as discussed above. During operation, there are, of course, many pairs of pulses "a","b" when contamination passes through the monitor 50.

Figure 12:
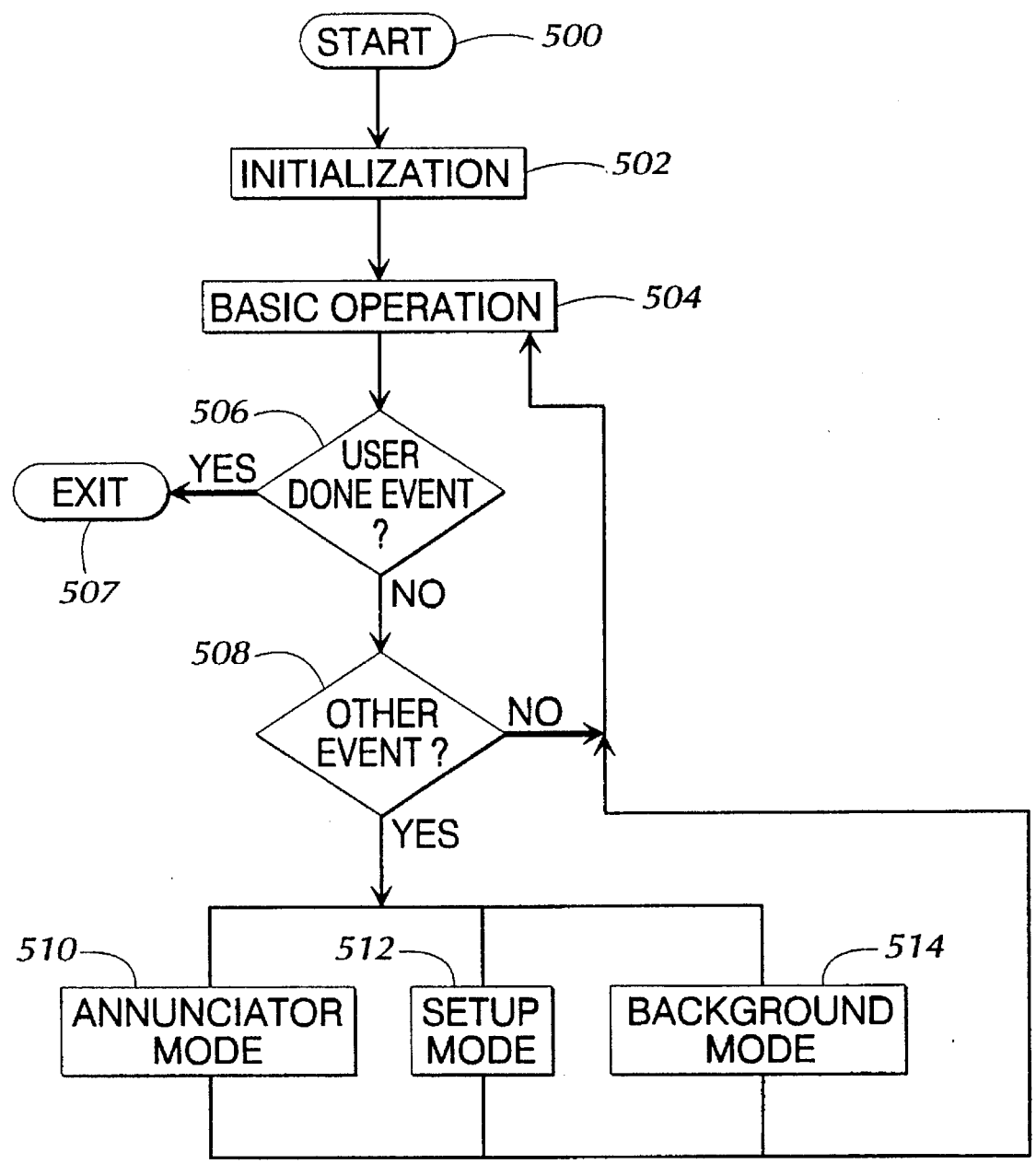
FIG. 12 is a simplified flow chart representation of software that controls the monitoring system, in accordance with the preferred embodiment of the present invention.

In accordance with the preferred embodiment of the present invention, a software program substantially controls the monitor 50. In accordance with the preferred embodiment of the present invention, the software is written in BORLAND C/C++ 3.1 and includes several different operational modes. FIG. 12 is a simplified flow chart representation of the software program. Subsequent to a start step 500, the software operates in an initialization mode 502. Subsequent to initialization mode 502, the software operates in a basic operation mode 504. The software is capable of being interacted with by a user, and a user interacts with the software by utilizing the keyboard 422 (FIG. 11) or the interactive "touch" screen monitor 420 (FIG. 11). Interactions which are recognized by and cause the software to take a specific action are referred to, as a matter of convention, as events. If a "user done" event is detected at step 506, the software is exited at step 507. Step 508 is sensitive to certain other events and, as discussed below, cooperates with other steps to cause the software to operate in an annunciator mode 510, setup mode 512, or background mode 514.

Figure 13:
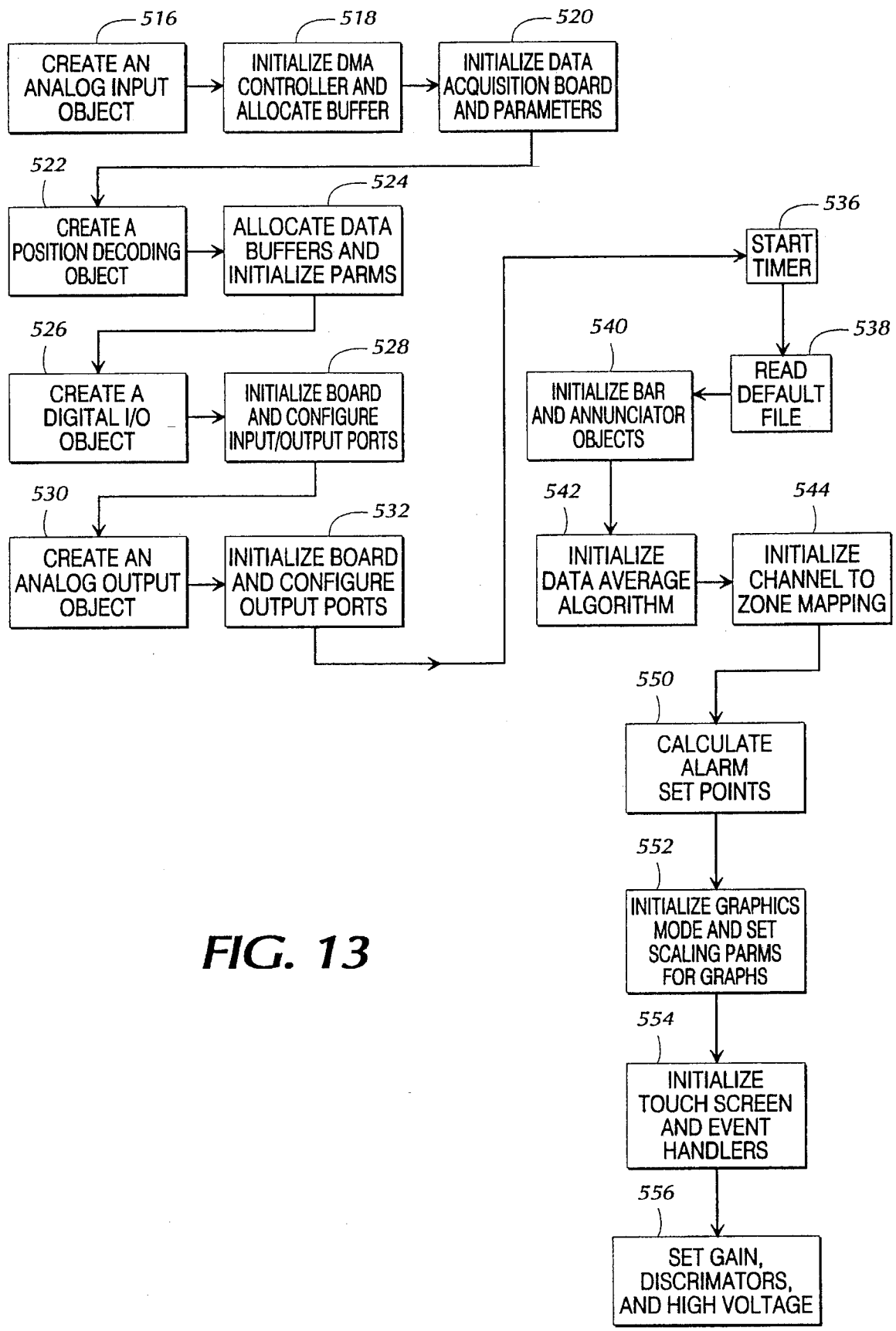
FIG. 13 is a flow chart representation of the monitoring system's initialization mode.

The initialization mode 502 is shown in greater detail in FIG. 13. The initialization mode 502 begins at step 516. Step 516 creates an analog input object. In accordance with the preferred embodiment of the present invention, an object is a data manager that is resident in RAM 410 (FIG. 11) and functions to hold and manipulate data. Step 516 creates an object that functions to manage data from the analog input card 412 (FIG. 11), as will be discussed in greater detail below. Step 518 creates a buffer in RAM 410 (FIG. 11) for storing data from the analog input card 412 and initializes direct memory access for transferring the data to the buffer. Step 520 initializes the analog input card 412. Step 522 creates a position decoding object which is discussed in greater detail below. Step 524 allocates data buffers in RAM 410 and initializes other parameters for use by the position decoding object which is created by step 522. Step 526 creates a digital input/output object for managing data directed to and received from the digital input/output card 416 (FIG. 11), as discussed in greater detail below. Step 528 initializes and configures card 416 so as to facilitate interactive control between the software and certain hardware items, as is discussed in greater detail below. Step 530 creates an analog output object for providing control over certain hardware components via the analog output card 414 (FIG. 11), as is discussed in greater detail below. Step 532 initializes the analog output card 414. Step 536 starts timer 406 (FIG. 11), which is discussed in greater detail below. Step 538 reads a default file from data storage 424 (FIG. 11). The default file stores various parameters used by the software in performing its tasks. Step 540 initializes bar and annunciator objects based, in part, upon data from the default file read in step 538. Step 542 initializes a data averaging algorithm that is retrieved from the default file and discussed below. Step 544 initializes, based upon data from the default file, channel to zone mapping, as is discussed in greater detail below. Step 550 calculates alarm setpoints based upon data from the default file. Step 552 initializes bar graphs that are displayed on one of the screens displayed by the interactive screen 420 (FIG. 11), as discussed in greater detail below. Step 554 initializes the screen 420 as well as event handlers. Events, as discussed above, are user actions which are recognized by and cause the software to take a specific action. Step 556 effects the analog output card 414 (FIG. 11) and instructs card 414 to adjust the discrimination of the SHAs 174 (FIG. 9), and the voltage level of the power supply 166 (FIG. 9), based upon values in the default file.

Figure 14:
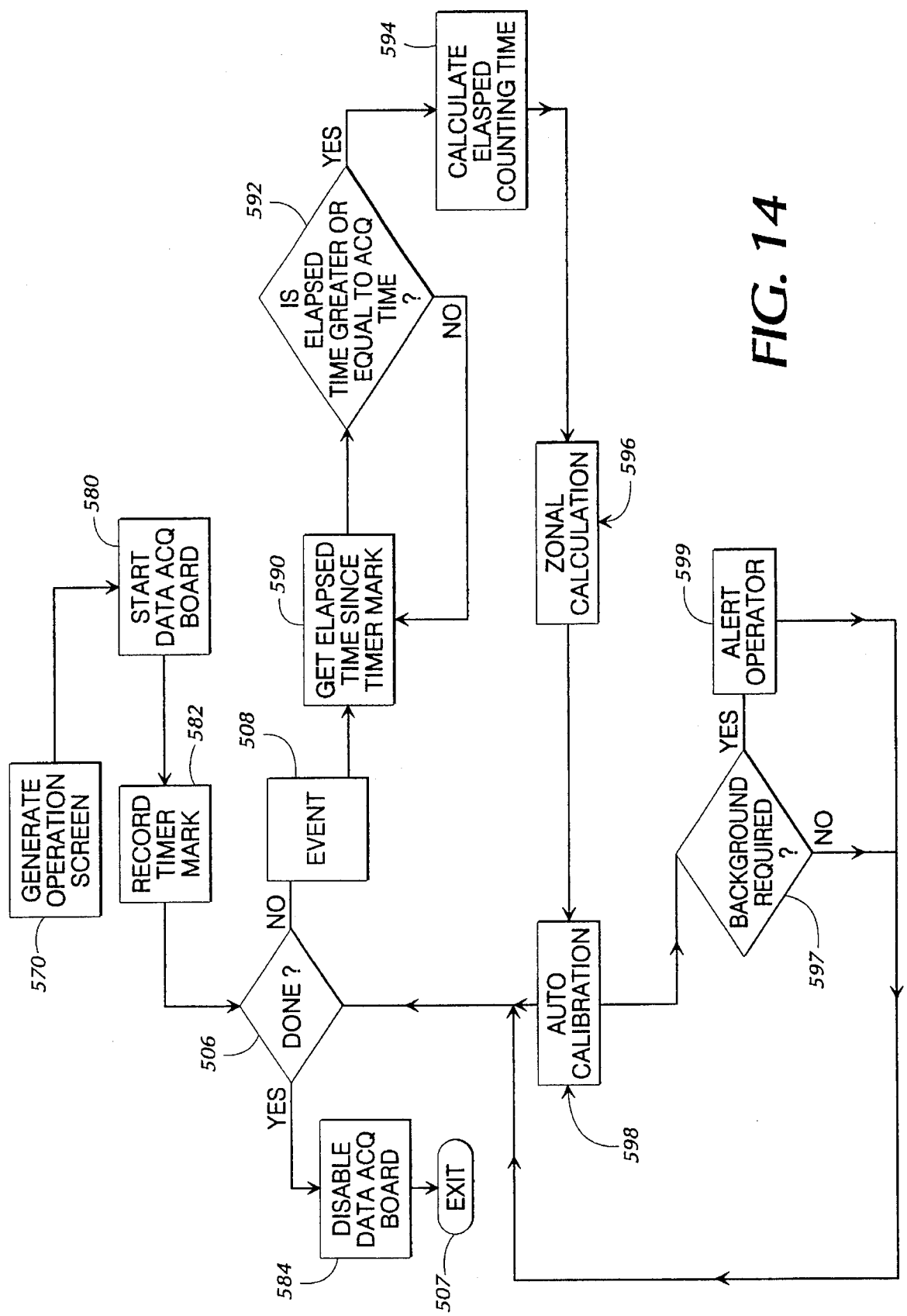
FIG. 14 is a flow diagram representation of the monitoring system's basic operation mode.
Figure 15:
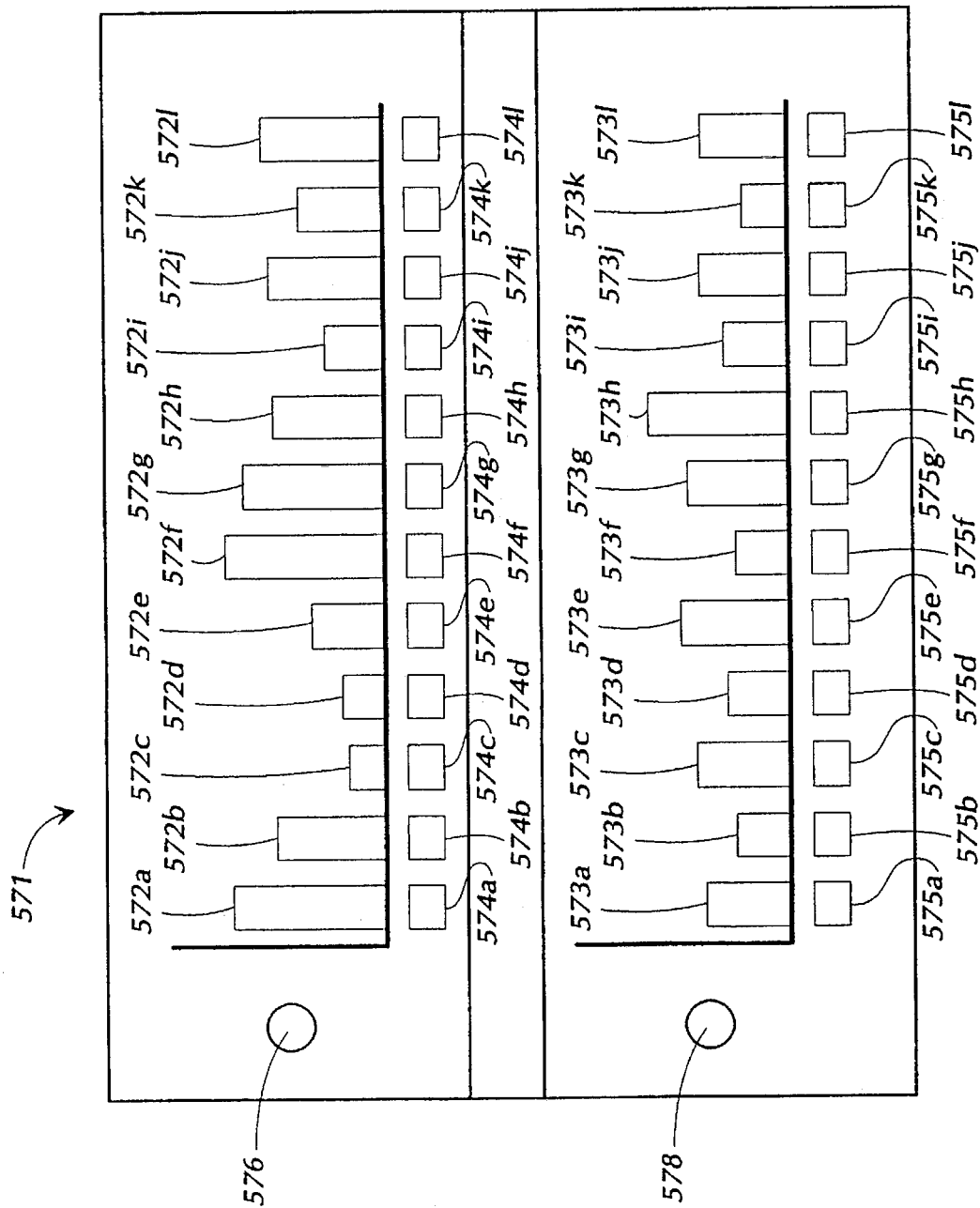
FIG. 15 is a representation of the operation screen as displayed on a monitor during basic operation mode.

Referring to FIG. 14, which is a flow diagram representation of the basic operation mode 504 (FIG. 12), the basic operation mode 504 begins with step 570 which follows in direct progression from step 556 (FIG. 13). Step 570 establishes an operation screen 571 on the interactive screen 420 (FIG. 11). The operation screen 571 is shown in FIG. 15. Referring specifically to FIG. 15, the operation screen 571 includes a plurality of bar graphs 572a–l that correspond to the upper detector 72a (FIG. 1) and a plurality of annunciators 574a–l that correspond to the upper detector 72a. Similarly, the operation screen 571 includes a plurality of bar graphs 573a–l that correspond to the lower detector 72b (FIG. 1) and a plurality of annunciators 575a–l that correspond to the lower detector 72b. As discussed in greater detail below, the bar graphs 572,573 visually display the amount of alpha and beta radiation detected along the length of the detectors 72, and the annunciators 574,575 "alarm" by changing color when radiation is present at above a predetermined limit. In accordance with the preferred embodiment of the present invention, the annunciators 574,575 also change color to indicate various faults such as high background or low count rate, or indicate that the user has selected to turn off the annunciator 574,575. The operation screen 571 further includes background button 576 and a setup button 578, each of which are discussed in greater detail below.

Referring back to FIG. 14, step 580 follows step 570. Step 580 starts the analog input card 412 (FIG. 11). Once the analog input card 412 is started, each time the card 412 is triggered by the coincidence circuit 184 (FIG. 9) via the trigger wire 186, card 412 reads channel "a" (FIG. 9) and channel "b" (FIG. 9) and processes the pair of pulses "a","b". Each pair of pulses "a","b" are digitized and the analog input object created at step 516 (FIG. 13) and in conjunction with direct memory access, place the pairs of pulses "a","b" in a buffer in RAM 410 (FIG. 11), whereby a data block is built. In accordance with the preferred embodiment of the present invention, the analog input card 412 further accepts a signal from a conveyor speed detector (not shown) such that the speed of the conveyor 66 (FIG. 1) is a continually known and updated parameter. The speed of the conveyor 66 is discussed in greater detail below. Step 582 checks the timer 406 (FIG. 11) and establishes a "reference time". As discussed above with reference to FIG. 12, if a "user done" event is detected at step 506, the software is exited 507. Step 584 occurs before 507 and "turns off" the analog input card 412. As is also discussed above with reference to FIG. 12, step 508 is sensitive to certain other events. If a user event involves the touching of an annunciator 574,575 (FIG. 15) the setup button 578 (FIG. 15) or the background button 576 (FIG. 15), step 508 cooperates with other steps to cause the software to operate in an annunciator mode 510 (FIG. 12), setup mode 512 (FIG. 12), or background mode 514 (FIG. 12). If no event is present with respect to steps 506 and 508, step 590 queries the timer 406 and determines the elapsed time since the reference time (i.e., step 582). Step 592 compares the step 590 elapsed time to a predetermined value. In accordance with the preferred embodiment of the present invention, the predetermined value is half of a second. As long as the step 590 elapsed time is less than the predetermined value, steps 590 and 592 operate in a "do-loop" fashion and pairs of pulses "a","b" are accordingly processed and accumulated in a data block in RAM 410 (FIG. 11). As soon as step 592 determines that the step 590 elapsed time is greater or equal to the predetermined value of time, step 594 queries the timer 406 (FIG. 11) and calculates a step 594 elapsed time (i.e., the elapsed time since step 582 queried the timer 406). Step 596 performs zonal calculations.

Figure 16:
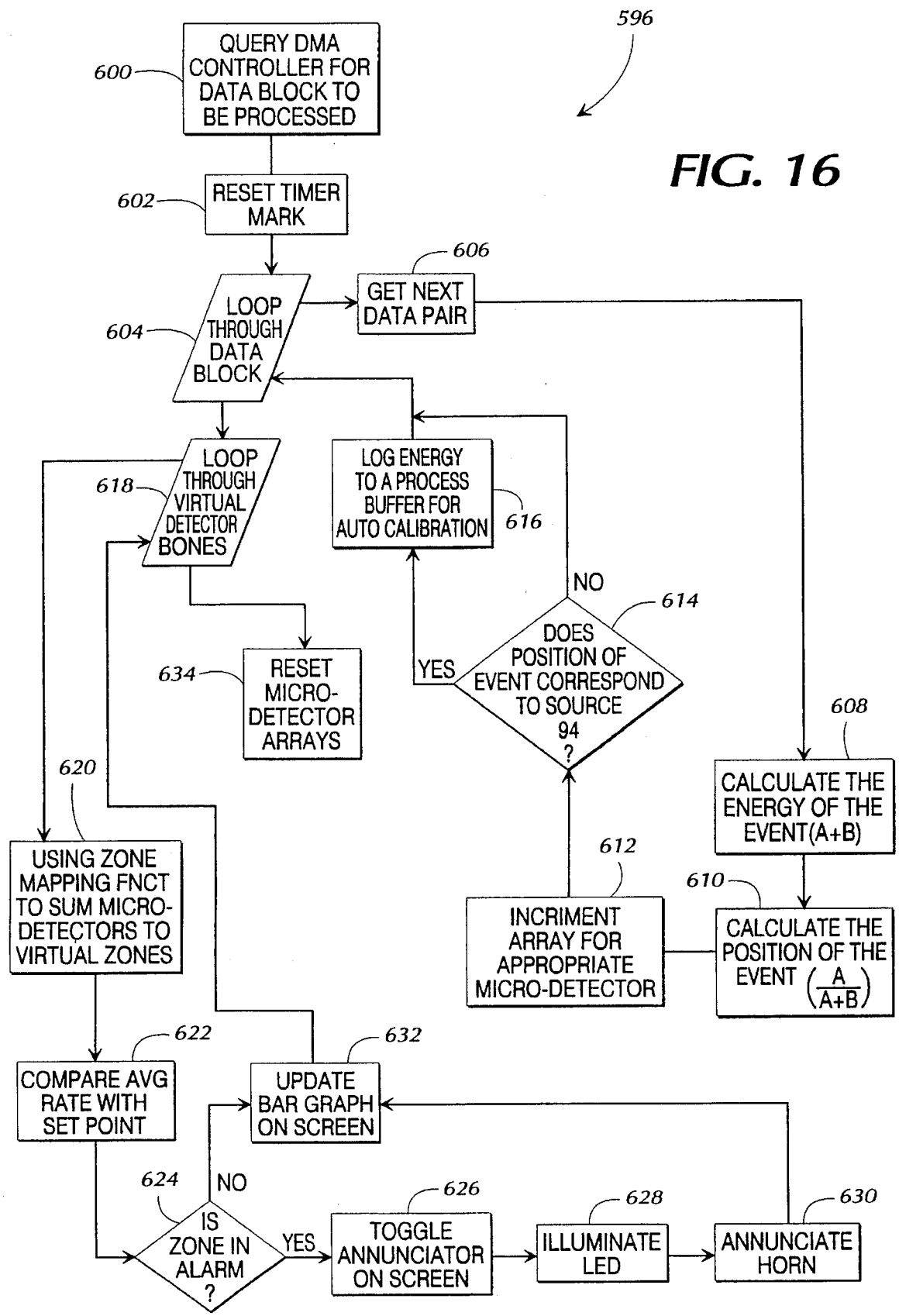
FIG. 16 is a flow chart representation of a sub-portion of the basic operation mode.

Step 596 is broken down into substeps that are shown in FIG. 16. The first substep of step 596 (FIG. 14) is step 600. Step 600 retrieves the datablock of that was built in RAM 410 (FIG. 11) between the operation of step 580 (FIG. 14) and step 594 (FIG. 14). Step 602 checks the timer 406 (FIG. 11) and re-establishes the "reference time", whereby, due to the continued operation of the analog input card 412 (FIG. 11), as discussed with respect to step 580 (FIG. 14) pairs of pulses "a","b" continue to be stored in a buffer in RAM (FIG. 410), whereby a new data block is built. Steps 604–616 loop through the data block retrieved by step 600. Step 606 selects a single pair of pulses "a","b". Step 608 calculates the energy of the charge that deposited upon wire 124 (FIGS. 5, 6, and 7) and caused the present pulses "a","b". The energy is calculated by determining the sum of pulses "a" and "b". Step 610 calculates the position at which the charge impacted one of the wires 124. The position (or channel in the position spectra 800 (FIG. 17)) is calculated by dividing pulse "a" by the sum of pulses "a" and "b". In accordance with alternate embodiments of the present invention, the difference of "a" and "b" is divided by the sum of "a" and "b" to determine position. Step 612 employs the position determined at step 610 and accordingly increments an array. Each entry in the array corresponds respectively to a segment of the plurality of segments along the wires 124 (i.e., each corresponds to a channel in the position spectra 800 (FIG. 17)). The incrementing of a particular array corresponds to a "count" or, more particularly, a charge impacting the particular segment of wire 124 that corresponds to that particular array. As a part of step 612, the step 594 elapsed time is employed to determine the count rate, the step 594 elapsed time and the speed of the conveyer belt 66 are used to calculate a first dimension of the channels in the position spectra 800, and the length of the wires 124 and the number of channels in the position spectra 800 are used to calculate a second dimension of the channels in the position spectra 800, and the first and second dimensions are multiplied to calculate the two dimensional size of each channel in the position spectra 800, whereby the count rate and size of each channel in the position spectra 800 is known.

FIG. 17 is a schematic representation of the detectors 72 and channels in the position spectra 800. As indicated, detector 72a defines a plurality of channels in the position spectra 800a. In accordance with the preferred embodiment of the present invention, the channels in the position spectra 800a are linearly and evenly distributed and can be "thought of as being" adjacent to the window 74 of detector 72a. As is also indicated, detector 72b defines a plurality of channels in the position spectra 800b. In accordance with the preferred embodiment of the present invention, the channels in the position spectra 800b are linearly and evenly distributed and can be "though of as being" adjacent to the window 74 of detector 72b. While various numbers of and variously sized channels in the position spectra 800 are within the scope of the present invention, in accordance with the preferred embodiment of the present invention, there are 256 channels in the position spectra 800a (referred to individually as 1 to 256) and 256 channels in the position spectra 800b (referred to individually as 257 to 512). Those channels in the position spectra 800 that are adjacent to source 94 are referred to as source channels in the position spectra 802. Channels in the position spectra are referred to hereafter simply as channels.

Referring back to FIG. 16, steps 614 and 616 store the energy and count rate for each of the source channels 802

(FIG. 17) in a buffer in RAM 410 (FIG. 11). These count rates and energies are employed to provide for automatic calibration, as is discussed in greater detail below. Steps 618 and step 620 use the channel 800 information generated at step 612, and append that information with information generated at step 612 during previous steps 596. This information is organized in a two dimensional, first-in-first-out array. The two dimensional, first-in-first-out array provides a two-dimensional organization of channels 800 such that the most recent channels 800 define a first row, the second most recent channels 800 define a second row, the third most recent channels 800 define a third row, and so on, such that there are a large plurality of rows. Calculated, based on the first-in-first-out array, are a plurality of virtual-zones that include various two-dimensional groupings of channels 800. In accordance with the preferred embodiment of the present invention, the virtual-zones are arranged in a repetitive, symmetric, pattern, as described in greater detail below. The count rate of a virtual zone is determined from the count rates of the channels 800 that it comprises. In accordance with the preferred embodiment of the present invention, a moving window average is used to calculate the count rate of the virtual-zones. In accordance with alternate embodiments of the present invention, a Savitsky-Golay averaging technique is employed to calculate the count rate of the virtual-zones. The employment of a moving window average improves the signal to noise ratio. In accordance with the preferred embodiment of the present invention, the two-dimensional size of a virtual zone is the summation of the two-dimensional sizes of the channels 800 that it comprises.

In accordance with the preferred embodiment of the present invention, the channels 800 are summed to define a first series of virtual-zones, referred to hereafter as subzones, that are approximately 25 cm$^2$. The subzones are substantially square and provide the total counts received in an area of approximately 5 cm by 5 cm. Due to the adjoinment of the subzones, they provide the count rate in adjoining 25 cm$^2$ areas of objects that are conveyed between detectors 72 (FIG. 1).

In accordance with the preferred embodiment of the present invention, the subzones are summed to define a second series of virtual-zones, referred to hereafter simply as zones, that are approximately 100 cm$^2$. The zones are substantially square and provide the total counts received in an area of approximately 10 cm by 10 cm. There are two layers of zones in this second series of virtual-zones (i.e., there is a first layer of zones and a second layer of zones). The first layer of zones is created by summing sets of four adjacent subzones into sets of adjacent zones. The second layer of zones is also created by summing sets of four adjacent subzones into sets of four adjacent zones, however, in accordance with the preferred embodiment of the present invention, the summation of the second layer of zones is initiated 5 cm in from two adjacent edges of the first layer of zones. Thus, the corners of zones overlap such that most zones of one layer of zones are completely overlapped (or underlapped) with the zones of the other layer of zones. A sample of this overlapping is schematically shown in FIG. 18. In FIG. 18, the smallest squares represent subzones. Those subzones identified as "1A" together comprise a first zone in the first layer of zones. Those subzones identified as "1B" together comprise a second zone in the first layer of zones. Those subzones identified as "1C" together comprise a third zone in the first layer of zones. Those subzones identified as "1D" together comprise a fourth zone in the first layer of zones. Those subzones identified as "2A" together comprise a first zone in the second layer of zones. Those subzones identified as "2B" together comprise a second zone in the second layer of zones. Those subzones identified as "2C" together comprise a third zone in the second layer of zones. Those subzones identified as "2D" together comprise a fourth zone in the second layer of zones. Due to the adjoinment and overlapping of the zones, they provide the count rate in adjoining and overlapping 100 cm$^2$ areas of objects that are conveyed between the detectors 72 (FIG. 1).

In accordance with the preferred embodiment of the present invention, the zones are summed to define a third series of virtual-zones, referred to hereafter as super-zones, that are approximately 1 m$^2$. As is the case with zones, 2 layers of superzones are created. The corners of super-zones overlap such that most super-zones of one layer of super-zones are completely overlapped (or underlapped) with the corners of four super-zones of the other layer of super-zones in the same manner that zones overlap (see FIG. 18). Additionally, the super-zones overlap the zones. An alarm limit is applied to each of the zones and superzones.

The employment of multiply sized, variously overlapping zones, with appropriate alarm limits for each zone increases the odds of detecting radioactive contamination greatly. It also allows the application of differing alarm set points to different areas, as is permitted by regulatory requirements. The overlapping and various sizes of the virtual-zones, with specific alarm setpoints for the zones and superzones allows for the differentiation between general contamination spread over a large area or spread over a smaller area, and single, discrete, intensely radioactive particles, which are indicated by a significant increase (such as, for example, a factor of ten or more) in zonal countrate in four or less zones as compared to adjacent zones on the same layer. In accordance with other embodiments, a peak search can be implemented following a zonal alarm to quantify the size of such a source.

Referring back to FIG. 16, step 620 corrects the zone count rate for any missed counts (dead time losses) by multiplying the count rate for the zones by a correction factor. The correction factor is based upon the counts made by the counting card 418 (FIGS. 9 and 11) divided by the number of counts processed at step 612 (FIG. 16). Dead time losses occur when data pairs are available at the SHAs 174 and the data pairs are not transferred or analyzed. This can occur, for example, at high count rates, when the buffer established by step 518 (FIG. 13) in RAM 410 is over written or when a radiation event occurs while the SHAs 174 are holding data that is being read by the analog input card 412 (FIG. 11) and are thereby unable to capture a count (i.e., pulses "a","b").

Step 622 subtracts the background count rates (discussed below) for respective zones and superzones from their current count rate to determine their net count rate due to contamination. The net count rates of respective zones and superzones are divided by their respective efficiency (discussed below) to determine the apparent source disintegration rate for the respective zones and subzones. Step 624 compares the count rate of each zone and superzone with a predetermined setpoint, and if the count rate of a zone or superzone exceeds its predetermined setpoint, steps 626, 628, 630 signal that zone or superzone is in alarm by toggling the annunciator(s) 574,575 (FIG. 15) and indicator(s) 80 (FIG. 2) that most appropriately identify the location of the zone or superzone that is in alarm. Step 632 updates the bargraphs 572,573 (FIG. 15) based upon the count rate of zones. In accordance with the preferred embodiment of the present invention, the data displayed by the bargraphs 572,573 are smoothed in a first order, linear kinetic fashion so that the data is exponentially smooth with a two second time constant. After looping through all of the virtual detector zones, step 634 resets the array used by step 612, and then control is transferred to step 598 (FIG. 14).

Referring back to FIG. 14, step 598 performs an autocalibration during the basic operation mode 504 (FIG. 12). When control is transferred to step 598, the total monitor 50 (FIGS. 1 and 2) count rate is determined and if it exceeds a predefined amount, the autocalibration is not performed and control is transferred to step 506, and the user is notified that an autocalibration is not being performed. The autocalibration would not be performed because, in order to perform an autocalibration, it is necessary for the monitor 50 to be able to clearly differentiate the sources 94 from other sources of radiation. Also, before an autocalibration is performed, the time that has elapsed since the last autocalibration is determined, and if a predetermined amount of time has passed, an autocalibration is performed. If the predetermined amount of time has not passed, the autocalibration is not performed and control is transferred to step 506. In accordance with the preferred embodiment of the present invention, an autocalibration would be performed if five minutes had elapsed since the last autocalibration. If an autocalibration is performed, the data stored by step 616 (FIG. 16) since the last autocalibration is employed.

The autocalibration step 598 performs several different functions. First, it functions to limit shifts in the positioning of the virtual-zones, or correct for any shifting of the virtual-zones, toward the sides 76,78 (FIG. 2) of the monitor 50. Such shifting might result, for example, if the filter amplifier 172 (FIG. 9) gain of the channels "a","b" become misaligned. As discussed previously, the sources 140 (FIGS. 3, 5, and 7) are fixed in location and in disintegration energy, and therefore provide stable references. Thus, as a part of the autocalibration procedure, a peak search is performed to locate the peaks that are attributable to the sources 94 (FIG. 3, 5, 7, and 8) in the position spectrum. If the sources 94 are identified as being in different channels 800 of the position spectra than they were previously in, a shifting of the channels 800 has occurred. Any of such shifting is quantified and compensated for mathematically in the calculation of virtual-zones in an effort to preclude the shifting of the virtual zones toward the sides 76,78 (i.e., zonal mapping is compensated). If it is determined that the channels 800 in the position spectra have shifted beyond a preestablished limit, typically more than 10 channels, the zonal mapping is compensated as discussed above, but in addition the user is notified of a potential problem.

After locating the peaks that are attributable to the sources 94 (FIG. 3, 5, 7, and 8), step 598 further functions to determine if the background count rate has exceeded a preestablished value. The background count rate is determined by averaging the count rate of several adjacent channels 800 on either side of the peaks. If the peaks are found not to be sufficiently distinguishable above the background, then the background button 576 (FIG. 15) is illuminated, and the user is notified of a potential problem.

Step 598 additionally calculates the energy attributable to each source 94 (FIGS. 3, 5, and 7), and averages these energies. The average is compared to a predetermined value. If the average of these energies is above or below the predetermined value, the controlling voltage supplied to the high voltage power supply 166 by the analog output card 414 is decreased or increased, respectively, in a proportional fashion, whereby the measured energy of the sources 94 is decreased or increased to correspond to the predetermined value. Additionally, the energy attributable to each source 94 is individually compared to the average energies of the sources 94; if a difference of greater than a predetermined limit is detected, then the background button 576 (FIG. 15) is illuminated. Step 598 additionally compares the count rate attributable to each source 94 to a predetermined count rate. If the average is above or below the predetermined value, the voltage applied to a SHA 174 by the analog output card 414 is decreased or increased respectively, whereby the sensitivity of the SHA 174 is increased or decreased. For example, if the count rate from a source 94 located at the end of detector 72a farthest from the jumper 158 is low or high, the voltage supplied by the analog output card 414 to SHA 174b is lowered or raised, respectively. If the average of the count rate attributable to all of the sources 94 is low or high, then the voltage supplied to both SHAs 174 is lowered or raised by an equal amount. If the count rate attributable to any source differs from the predetermined count rate by greater than a predetermined percentage (typically 25%), then the background button 576 (FIG. 15) is illuminated.

Once the autocalibration procedure (i.e. step 598) is complete Step 597 determines whether or not an evaluation of the background count rate is necessary by determining the time that has elapsed since the last check of the background count rate, and if that elapsed time is greater than a predetermined value, control is transferred to step 599. Step 599 notifies the user that the evaluation of the background count rate is necessary by causing the background button 576 (FIG. 15) on the operation screen 571 to illuminate. Subsequent to step 599, the software returns to step 506 and continues to "loop" until an event is realized by step 506 or step 508, as discussed above.

Referring again to FIG. 14, as discussed above, when an appropriate user event is recognized at step 508 (i.e., the event involves the touching of an annunciator 574,575 (FIG. 15), the setup button 578 (FIG. 15), or the background button 576 (FIG. 15)), step 508 cooperates with other steps to cause the software to operate in an annunciator mode 510 (FIG. 12), setup mode 512 (FIG. 12), or background mode 514 (FIG. 12), respectively.

If a user event involving an annunciator 574,575 (FIG. 15) is detected by step 508, control is transferred from step 508 to an annunciator routine that allows a user to selectively reset an alarmed annunciator 574,575 (FIG. 15).

If a user event involving the touching of the background button 576 (FIG. 15) is identified at step 508 (FIG. 14), then control is transferred to the background mode 514 (FIG. 12). Prior to doing an actual background check, the data stored by step 616 (FIG. 16) is employed to, as necessary, adjust the voltage of the high voltage power supply 166 (FIG. 9), the discrimination level of the SHAs 174 (FIG. 9), and to effectively correct for unequal gains between the channels "a","b". The voltage of the high voltage power supply 166 is adjusted as discussed above with respect to step 598. Likewise, the discrimination of the SHAs is adjusted as discussed above with respect to step 598.

In accordance with the preferred embodiment of the present invention, the gain of channels "a","b" is effectively adjusted by mathematically adjusting the position of the channels 800 (FIG. 17) with respect to the sides 76,78 of the monitor (FIG. 2). Such a mathematical adjustment is readily made by first computing, for each of the four sources 94 individually, the difference between its position as determined from the peak search and its actual position. The computed differences are averaged and the average value is used to correct the values (which correspond to positions) of the channels 800 relative to the sides 76,78 of the monitor 50 (FIG. 1). In accordance with alternate embodiments of the present invention, the gain of channels "a","b" is adjusted by adjusting the gain of the filter amplifiers 172.

In background mode 514 subsequent to the above adjustments, clothing is preferably removed from the conveyer assembly 62 (FIG. 1), and data is queried in the same manner in which it is in steps 600–622 (FIG. 16). As a result, the background count rate is determined for each of the virtual-zones. These background count rates are stored for later use during step 622 (FIG. 16).

If a user event involving the touching of the setup button 578 (FIG. 15) is identified at step 508 (FIG. 14), then control is transferred to the setup mode 512 (FIG. 12). The setup mode 512 can be optionally protected by a user entered password in an effort to assure that the setup mode is accessed only by authorized personnel. The setup mode 512 would be entered, for example, when a system is initially installed or subsequently when the user desires to modify certain parameters. During the setup mode 512 the user has several options, subsequent to each of which the user is returned to setup mode 512.

A first option involves a monitor 50 system alignment that includes the adjustment of the output of the high voltage power supply 166 (FIG. 9). In accordance with the preferred embodiment of the present invention, the output of the high voltage power supply 166 is set to approximately 1800 volts. A second adjustment made during the system alignment option involves a manual adjustment of the potentiometers of the filter amplifiers 172a,b such that the maximum pulse height observed from either channel "a" or channel "b" of the monitor 50 is characterized as approximately 9.9 volts at the analog input card 412. A third adjustment made during the system alignment involves, while data is being acquired, the aligning of the center of the sources 94 (FIGS. 3, 5, and 7) in predetermined channels 800. This is accomplished, for example, by observing the count rate of the predetermined channels 800 and their adjacent zones, and adjusting the gain of one channel "a" or "b" (FIG. 9) until the counts attributable to the sources 94 are properly aligned with their respective predetermined channels 800. In accordance with the preferred embodiment of the present invention, alignment of sources 94 with their respective channels 800 are handled by, for example, manually adjusting the potentiometer that controls the fine gain of each single filter amplifier 172a,b (FIG. 9).

The fourth adjustment made in the system alignment of the setup mode 512 facilitates the establishment of the minimum discrimination levels of the SHAs 174 (FIG. 9). At the same time that the total detector count rate is being calculated and continuously updated, the analog output card 414 which, as discussed above, controls the SHAs 174 (FIG. 9) is manipulated. The voltage supplied to the SHAs 174 is decreased, whereby the sensitivity of the detectors 72 is increased. For each detector 72 individually, the voltage to the SHAs 174 is continuously and slowly decreased until a point at which the detector count rates increase rapidly or saturate. An example of a "saturation" is when the count rate at the current setting reaches three times the background count rate observed during the previous setting of the voltages. Once the point of saturation is reached, the voltage supplied to the SHAs 174 is increased a limited amount so as to optimize the operating parameters of the system. In accordance with the preferred embodiment of the present invention, the voltage supplied to the SHAs 174 is increased by approximately 25%. Such optimization ensures that the optimum balance between sensitivity and noise detection of the system. Of course the adjustments associated with options one through four above are best made in an iterative fashion.

An efficiency mode is another option of the setup mode 512. During the efficiency mode a source of known strength is strategically passed by the user through the detector with the monitor 50 acquiring data. Based on the strength of the known source and the maximum count rate measured by any zone, the efficiency of the zones is determined. These efficiencies are employed at step 622 (FIG. 16), as discussed above.

The user is also capable of transferring to an annunciator mode that permits the user to deactivate the alarm for an annunciator 574,575, or activate the alarm for an annunciator 575,575 that has been disabled.

The user is also capable of transferring to a test mode that verifies operation of the indicators 80 (FIG. 1) and horns that function, by way of digital card 416 (FIG. 11), as alarm indicators during the operation mode 504 (FIG. 12). The user is also capable of transferring to a setpoint option that facilitates the changing the alarm setpoints. The user is also capable of transferring to an option that compares the count rate attributable to each source 94 to a predetermined count rate. After operation of each of the immediately above-mentioned subroutines, control is returned to the setup mode 512. And, the user is capable of exiting the setup mode 512 and returning the laundry monitor 50 to the basic operation mode 504 by transferring control back to step 508 (FIG. 14).

In accordance with alternate embodiments of the present invention, multiple detectors 72 are jumpered together. Also, radiation monitors 72 are incorporated into portal and floor monitors in accordance with alternate embodiments of the present invention.

Whereas this invention has been described in detail with particular reference to preferred embodiments and alternate embodiments thereof, it will be understood that variations and modifications can be effected within the spirit and scope of the invention, as described herein before and as defined in the appended claims.

I claim:

1. A method of measuring radiation emitted from a first source and calibrating, the method comprising steps of:

orienting an elongated member relative to the first source so that radiation emitted from the first source irradiates the elongated member; and electronically monitoring the elongated member including steps of designating a plurality of segments along the elongated member so that each segment of the plurality of segments effectively functions as an individual radiation detector, and quantifying radiation emitted from the first source by determining a radiation measurement for segments of the plurality of segments that are irradiated by the first source;

calibrating the step of electronically monitoring, wherein the calibrating step is automatic and includes a step of irradiating a first segment of the plurality of segments with radiation emitted from a calibrating source, and wherein the electronically monitoring step includes a step of quantifying radiation emitted from the calibrating source by determining a radiation measurement for at least said first segment of the plurality of segments, and wherein the calibrating step further includes a step of adjusting the step of electronically monitoring, wherein the adjusting step is dependent upon the step of quantifying radiation emitted from the calibrating source.

2. The method of claim 1, wherein, wherein the step of electronic monitoring includes a step of operating in a limited proportionality range, wherein events from alpha radiation are gas gain limited while events from beta radiation are not, whereby both alpha radiation and beta radiation are monitored.

3. The method of claim 1, wherein the calibrating step further includes a step of substantially continuously causing radiation emitted from the calibrating source to deposit upon the first segment of the plurality of segments.

4. The method of claim 1, wherein the step of calibrating further includes a step of isolating, at least partially, the first segment of the plurality of segments from the first source.

5. The method of claim 1, wherein the step of quantifying radiation emitted from the first source and the step of quantifying radiation emitted from the calibrating source are concurrent.

6. The method of claim 1, wherein the radiation emitted from the first source and the radiation emitted from the calibrating source have substantially similar energy characteristics.

7. The method of claim 6, wherein the first source and the calibrating source emit alpha radiation.

8. The method of claim 1, further comprising a step of causing the radiation given off by the calibrating source to be collimated.

9. The method of claim 8, wherein the elongated member is an anode wire that is disposed within a detector body, and wherein the calibrating step further includes a step of aiming the radiation given off by the calibrating source directly at a first segment of the anode wire.

10. The method of claim 1, wherein the calibrating source is a first calibrating source, and wherein the calibrating step further includes steps of
aiming the radiation given off by the first calibrating source directly at the first segment of the plurality of segments,
providing a second calibrating source that emits radiation, and
aiming the radiation given off by the second calibrating source directly at a second segment of the plurality of segments, wherein the first segment of the plurality of segments is displaced from the second segment of the plurality of segments such that a plurality of intermediate segments of the plurality of segments are defined between the first and second segments of the plurality of segments.

11. The method of claim 1, wherein the calibrating source has at least one known characteristic, and wherein the calibrating step further includes steps of
comparing the radiation measurement of the first segment with the known characteristic of the calibrating source, and
adjusting the step of electronically monitoring so that the radiation measurement of the first segment correlates to the known characteristic of the calibrating source.

12. The method of claim 11, wherein the known characteristic of the calibrating source is count rate, wherein the radiation measurement determined for the first segment of the plurality of segments is the count rate of the calibrating source, wherein the comparing step includes a step of comparing the known count rate of the calibrating source to the measured count rate of the calibrating source, and the step of adjusting includes a step of adjusting such that the measured count rate of the calibrating source correlates to the known count rate of the calibrating source.

13. The method of claim 12, wherein, wherein the step of electronically monitoring further includes a step of discriminating so that only radiation above a certain threshold is subjected to the quantifying steps, and wherein the step of adjusting such that measured count rate of the calibrating source correlates to the known count rate of the calibrating source includes a step of adjusting the threshold of the discriminating step.

14. The method of claim 11, wherein the known characteristic of the calibrating source is the energy of the calibrating source, wherein the radiation measurement determined for the first segment of the plurality of segments is the energy of the calibrating source, wherein the comparing step includes a step of comparing the known energy of the calibrating source to the measured energy of the calibrating source, and wherein the step of adjusting includes a step of adjusting such that the measured energy of the calibrating source correlates to the known energy of the calibrating source.

15. The method of claim 14, wherein the step of electronically monitoring includes a step of applying a voltage potential to the elongated member, and wherein the step of adjusting such that the measured energy of the calibrating source correlates to the known energy of the calibrating source includes a step of adjusting the voltage potential applied to the elongated member.

16. The method of claim 14, wherein the irradiation of the elongated member causes signals to be generated, wherein the step of electronically monitoring includes a step of amplifying the signals, whereby there is gain in the strength of the signals, wherein the step of adjusting such that the measured energy of the calibrating source correlates to the known energy of the calibrating source includes a step of adjusting the gain.

17. The method of claim 1, wherein the step of quantifying radiation emitted from the calibrating source includes steps of
performing a first peak search to determine which segment of the plurality of segments is most irradiated by the calibrating source, and
performing a second peak search subsequent to the step of performing the first peak search to determine which segment of the plurality of segments is most irradiated by the calibrating source; and wherein the step of adjusting the step of electronically monitoring includes steps of
comparing the results of the first peak search and the second peak search, and compensating for differences between the results of the first peak search and the second peak search.

18. The method of claim 17, wherein the step of compensating includes a step of adjusting the step of electronically monitoring so that the segment of the plurality of segments that is most irradiated by the calibrating source during the second peak search corresponds to the segment of the plurality of segments that is most irradiated by the calibrating source during the first peak search.

19. The method of claim 17, wherein the step of compensating for differences between the results of the first peak search and the second peak includes a step of digitally adjusting the step of electronically monitoring.

20. The method of claim 19,
wherein the electronically monitoring step includes steps of
designating a plurality of overlapping zones as overlapping combinations of segments of the plurality of segments such that each zone of the plurality of overlapping zones has a position, and
determining a radiation measurement for each zone of the plurality of overlapping zones by combining the radiation measurements of the segments of the plurality of segments that comprise each zone, and
wherein the step of digitally adjusting includes a step of shifting the positioning of zones of the plurality of zones to compensate for differences between the results of the first peak search and the second peak search.

21. The method of claim 17,
wherein the irradiation of the elongated member causes a signal,
wherein the step of electronically monitoring includes a step of amplifying the signal, whereby there is gain in the signal strength, and
wherein the compensating step includes a step of adjusting the gain.

22. A method of measuring radiation emitted from a source, the method comprising steps of:
placing an elongated member near the source so that radiation emitted from the source irradiates the elongated member; and
electronically monitoring the elongated member including steps of
designating a plurality of segments along the elongated member,
obtaining a radiation measurement for each segment of the plurality of segments,
designating a plurality of overlapping zones as overlapping combinations of segments of the plurality of segments, and
determining a radiation measurement for each zone of the plurality of overlapping zones by combining the radiation measurements of the segments of the plurality of segments that comprise each zone.

23. The method of claim 22,
wherein the plurality of overlapping zones is a first plurality of overlapping zones, and
wherein the method further comprises steps of
designating a second plurality of overlapping zones as overlapping combinations of zones of the first plurality of overlapping zones, and
determining a radiation measurement for each zone of the second plurality of overlapping zones by combining the radiation measurements of the zones of the first plurality of zones that comprise each zone of the second plurality of zones.

24. A method of measuring radiation emitted from a source, the method comprising steps of:
placing an elongated member near the source so that radiation emitted from the source irradiates the elongated member; and
causing transverse relative motion, at a defined speed, between the source and the elongated member; and
electronically monitoring the elongated member including steps of
designating a plurality of segments along the elongated member, wherein each segment of the plurality of segments defines a segment length,
obtaining a radiation measurement for each segment of the plurality of segments,
designating a plurality of unit areas, each unit area of the plurality of unit areas being defined by combining a segment length, the defined speed, and a given period of time, and
determining a radiation measurement for each unit area, wherein for a representative unit area of the plurality of unit areas the radiation measurement is determined by combining the radiation measurements of the segment of the representative unit area in the given period of time.

25. The method of claim 24, wherein the step of electronically monitoring further includes steps of
designating a plurality of overlapping zones as overlapping combinations of unit areas, and
combining the radiation measurements of the unit areas of each zone of the plurality of overlapping zones to determine a radiation measurement for each zone.

26. An apparatus for monitoring radiation emitted from a source, the apparatus comprising:
a radiation detector including
a detector body defining and at least partially enclosing a detector cavity,
an elongated anode member extending through said detector cavity,
a first calibration source positioned to irradiate a first portion of said anode member, and
a second calibration source positioned to irradiate a second portion of said anode member, wherein said first source is displaced from said second source such that an intermediate portion of said anode member is defined between said first and second portions of said anode member.

27. The apparatus of claim 26, further comprising an electronic means connected to said anode member for obtaining a radiation measurement.

28. An apparatus for monitoring radiation emitted from a source, the apparatus comprising:
a radiation detector including
a detector body defining and at least partially enclosing a detector cavity,
an elongated anode member extending through said detector cavity, and
a calibration source positioned to substantially continuously irradiate a portion of said anode member, wherein radiation emitted from the first source and radiation emitted from the calibrating source have substantially similar energy characteristics.

29. The apparatus of claim 28, further comprising an electronic means connected to said anode member for obtaining a radiation measurement.

30. The apparatus of claim 28, wherein, said calibration source is a collimating source including
a pipe plug defining a bore therethrough tapering from a larger diameter to a smaller diameter,
a radiation source disposed within said bore and defining a size incapable of passing through said smaller diameter of said bore, and
a setscrew disposed within said larger diameter of said bore and maintaining said radiation source within said bore, whereby said radiation source irradiates through said smaller diameter portion of said bore.

* * * * *